United States Patent
Hale et al.

(10) Patent No.: US 10,011,458 B2
(45) Date of Patent: Jul. 3, 2018

(54) REMOVABLE DUPLEXER TRAY MODULE FOR AN IMAGING APPARATUS

(71) Applicant: LEXMARK INTERNATIONAL, INC., Lexington, KY (US)

(72) Inventors: Jason Paul Hale, Richmond, KY (US); Todd A. Quinn, Carlisle, KY (US); Daniel Lee Thomas, Lexington, KY (US); Edward Lynn Triplett, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 15/146,127

(22) Filed: May 4, 2016

(65) Prior Publication Data

US 2017/0320701 A1 Nov. 9, 2017

(51) Int. Cl.
*B65H 5/00* (2006.01)
*B65H 85/00* (2006.01)
*H04N 1/00* (2006.01)
*G03G 15/00* (2006.01)
*B65H 5/24* (2006.01)
*B65H 5/06* (2006.01)
(Continued)

(52) U.S. Cl.
CPC ............. *B65H 85/00* (2013.01); *B65H 5/062* (2013.01); *B65H 5/24* (2013.01); *B65H 5/26* (2013.01); *B65H 5/36* (2013.01); *B65H 5/38* (2013.01); *G03G 15/657* (2013.01); *H04N 1/00538* (2013.01); *B65H 2402/10* (2013.01); *B65H 2402/32* (2013.01); *B65H 2402/441* (2013.01); *H04N 2201/0094* (2013.01)

(58) Field of Classification Search
CPC .......... B65H 5/06; B65H 5/062; B65H 5/068; B65H 5/26; B65H 5/36; B65H 5/38; B65H 85/00; B65H 2301/448; B65H 2402/10; B65H 2402/32; B65H 2402/41; B65H 2402/412; B65H 2402/44; B65H 2402/441; B65H 2402/442; B65H 2404/152; B65H 2404/611; H04N 1/00538
See application file for complete search history.

(56) References Cited

U.S. PATENT DOCUMENTS 6,145,828 A * 11/2000 Arai ..................... G03G 15/231
 271/186
6,340,157 B1 * 1/2002 Watanabe .............. B65H 15/00
 271/186

(Continued)

*Primary Examiner* — Prasad V Gokhale

(57) ABSTRACT

A removable media handling module includes a body that is horizontally slidable into and removable from an imaging apparatus. The media handling module includes a lower media guide extending between a front and a rear of the body in a direction of insertion of the body into the imaging apparatus. With the media handling module inserted into the imaging apparatus, the lower media guide is positioned parallel to and spaced from a corresponding upper media guide mounted in the imaging apparatus to form at least a portion of a duplex media path therebetween. The media handling module includes a media feed through channel extending from a bottom of the body to an entrance of a simplex media path to allow media to be fed from a media tray below the media handling module and into the simplex media path when the media handling module is installed in the imaging apparatus.

18 Claims, 16 Drawing Sheets

(51) Int. Cl.
*B65H 5/26* (2006.01)
*B65H 5/36* (2006.01)
*B65H 5/38* (2006.01)

(56) References Cited

U.S. PATENT DOCUMENTS

| | | | |
|---|---|---|---|
| 2002/0074720 A1* | 6/2002 | Kato | B41J 3/60 |
| | | | 271/264 |
| 2009/0059313 A1* | 3/2009 | Tseng | B65H 5/062 |
| | | | 358/474 |
| 2010/0232854 A1* | 9/2010 | Takagi | B65H 5/26 |
| | | | 399/401 |
| 2011/0180987 A1* | 7/2011 | Matsuno | B65H 5/38 |
| | | | 271/225 |
| 2014/0241776 A1* | 8/2014 | Sato | G03G 15/6529 |
| | | | 399/388 |
| 2014/0353908 A1* | 12/2014 | Kobayashi | B65H 9/00 |
| | | | 271/226 |

\* cited by examiner

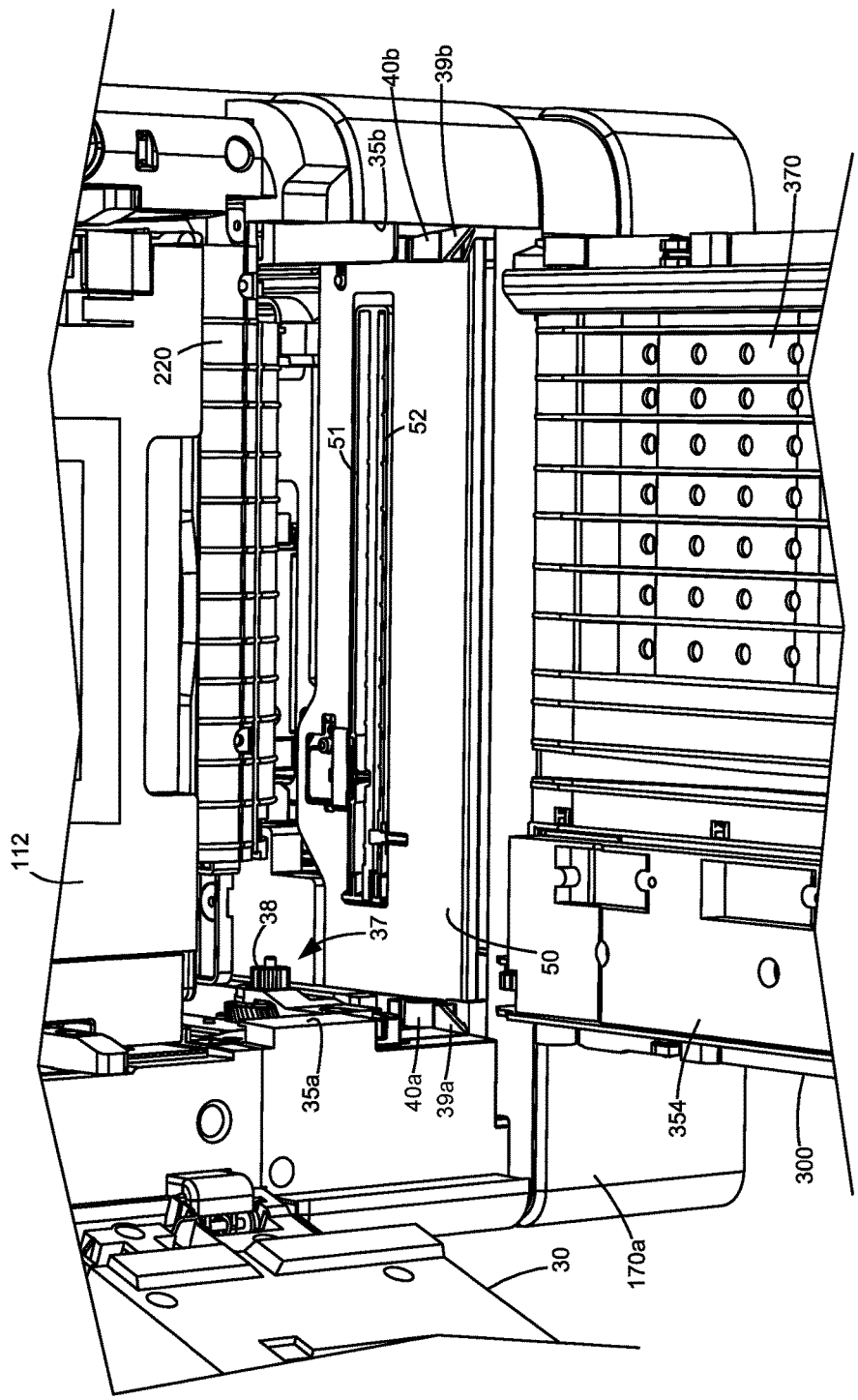

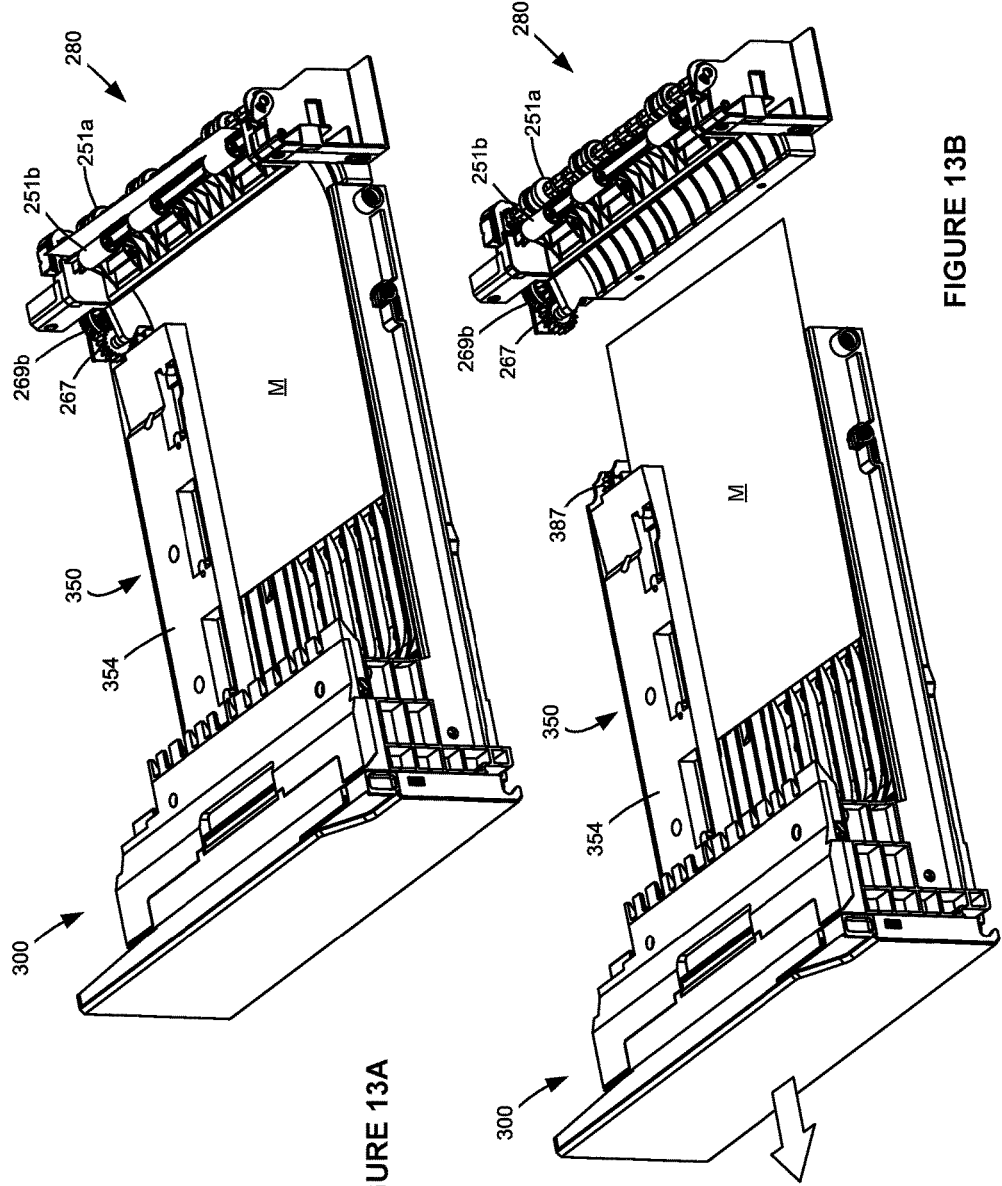

REMOVABLE DUPLEXER TRAY MODULE FOR AN IMAGING APPARATUS

CROSS REFERENCES TO RELATED APPLICATIONS

This application is related to U.S. patent application Ser. No. 15/146,115, filed May 4, 2016, and entitled "REMOVABLE DUPLEXER TRAY MODULE FOR AN IMAGING APPARATUS".

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates generally to a removable media handling module in an imaging apparatus, and, more particularly, to a slide-out duplexer tray module removable from the imaging apparatus.

2. Description of the Related Art

Printing on both sides of a sheet of media, referred to as duplex printing, provides an effective way for reducing the environmental impact of printing since less media sheets are required. Imaging devices that include duplex printing functionality are provided with a duplex media path that is used to return a printed media sheet back into a print zone to have its second side printed. Some duplex designs integrate the duplex media path into a middle portion of the imaging device. For example, in some imaging devices utilizing a C-shaped or S-shaped media feedpath, the duplex media path is integrated into a middle portion of the device and extends within an interior thereof between opposing sides of the device. In order to provide a means for clearing media jams, a jam-door is typically positioned in the rear side of the device to provide access to the duplex media path. In this way, a rear portion of the duplex media path may be exposed when the jam-door is opened thereby providing access for clearing media jams therein. However, difficulty in terms of removing a jammed or damaged piece of media from the middle of the imaging device may still exist as the portion of the duplex media path extending within the device would generally remain hidden from view within the interior of the device even when a rear jam-door is opened. Accordingly, there is a need for an improved means for handling media jams in imaging devices with duplex functionality.

SUMMARY

Disclosed is a removable media handling module for an imaging apparatus having a body that is horizontally slidable into and removable from the imaging apparatus through an opening thereof. The media handling module includes a lower media guide extending between a front and a rear of the body in a direction of insertion of the body into the imaging apparatus. With the media handling module inserted into the imaging apparatus, the lower media guide is positioned parallel to and spaced from a corresponding upper media guide mounted in the imaging apparatus such that the first and second media guides form at least a portion of a duplex media path therebetween which directs a printed media sheet received from a media exit path back into a simplex media path for printing an image on the other side of the printed media sheet. When the media handling module is slidably removed from the imaging apparatus, the lower media guide is exposed for clearing media jams in the duplex media path.

In one example embodiment, the removable media handling module includes a media feed through channel extending from a bottom of the body to an entrance of the simplex media path. The media feed through channel allows for a media sheet to be fed from a media input tray of the imaging apparatus positioned below the media handling module and into the simplex media path when the media handling module is inserted into the imaging apparatus.

In another example embodiment, the removable media handling module includes a manual input feeder having a fold-out tray that is foldable out of the front of the body for holding at least one media sheet. The manual input feeder includes a media path branch having an entrance in communication with the fold-out tray and an exit in communication with the entrance of the simplex media path to allow the at least one media sheet when disposed on the fold-out tray to be fed into the simplex media path when the media handling module is inserted into the imaging apparatus.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

FIG. 2E illustrates the media handling module removed out of the imaging apparatus.

FIG. 13A illustrates a media sheet spanning between the rear guide assembly and the removable media handling module.

FIG. 13B illustrates media sheet retention in the media handling module during removal thereof from the imaging apparatus.

DETAILED DESCRIPTION

Figure 1:
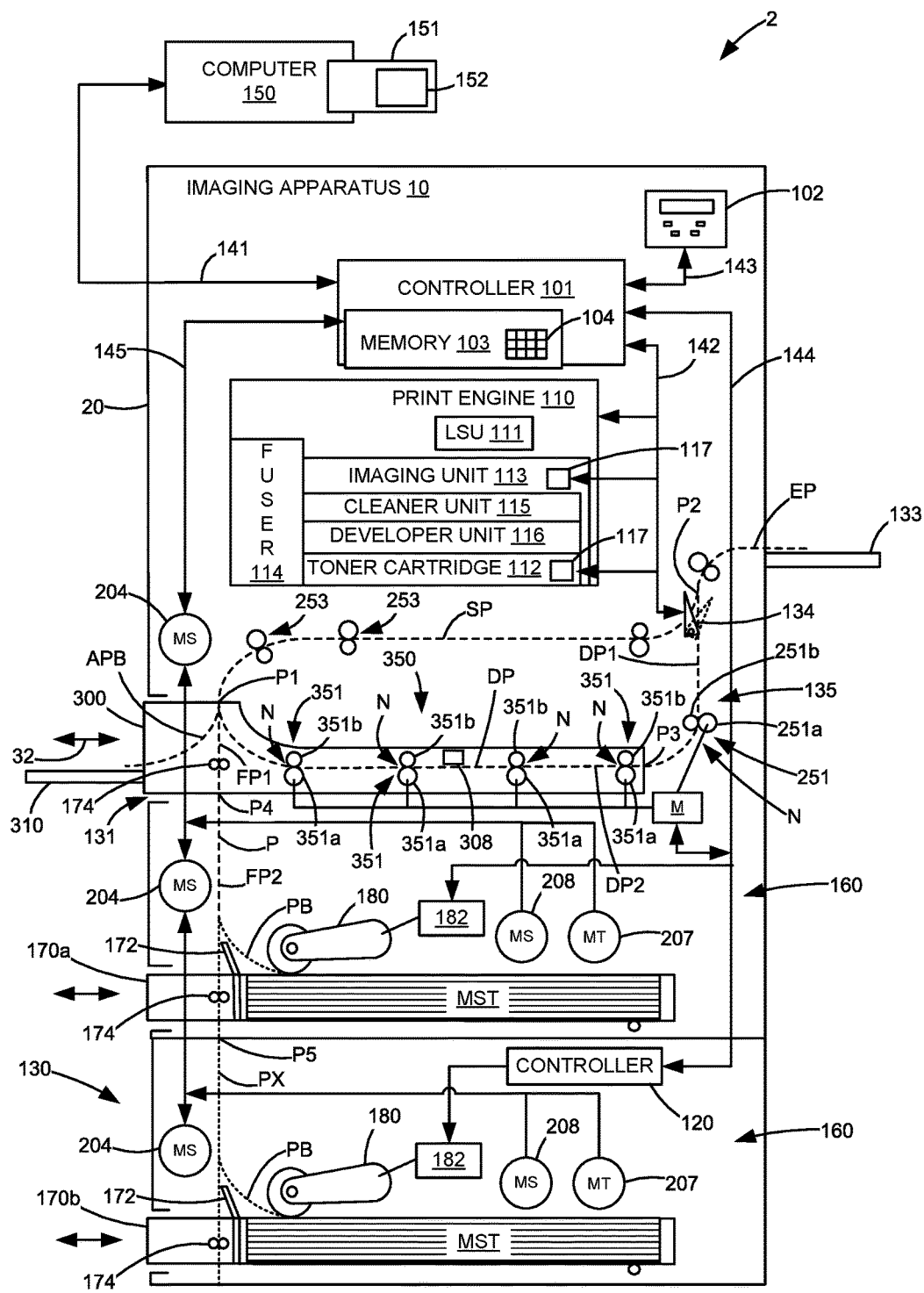
FIG. 1 is a schematic illustration of an imaging system according to one example embodiment.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open-ended terms that indicate the presence of stated elements or features, but do not preclude additional elements or features. The articles "a", "an", and "the" are intended to include the plural as well as the singular, unless the context clearly indicates otherwise. The terms "including," "comprising," or "having" and variations thereof used herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

In addition, it should be understood that embodiments of the present disclosure may include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to present example embodiments of the present disclosure and that other alternative mechanical configurations are possible.

It will be further understood that the methods described may be implemented by computer program instructions. These computer program instructions may be loaded onto a general purpose computer, special purpose computer, processor, or other programmable data processing apparatus such that the instructions which execute on the computer or other programmable data processing apparatus may create means for implementing the functionality of each action in the methods discussed in detail in the descriptions below. These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the functions specified in the methods. Computer readable storage medium includes, for example, disks, CD-ROMS, Flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions of the described methods. Results of the computer program instructions may be used by other computer programs or may be displayed in a user interface or computer display of the computer or other programmable apparatus that implements the functions or the computer program instructions.

The term "output" as used herein encompasses output from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. The term "button" as used herein means any component, whether a physical component or graphic user interface icon, that is engaged to initiate an action or event.

The term "image" as used herein encompasses any printed or electronic form of text, graphics, or a combination thereof "Media" or "media sheet" refers to a material that receives a printed image or, with a document to be scanned, a material containing a printed image. The media is said to move along the media path and any media path extensions from an upstream location to a downstream location as it moves from the media trays or media input areas to the output area of the imaging apparatus. For a top feed option tray, the top of the option tray is downstream from the bottom of the option tray. Conversely, for a bottom feed option tray the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the media path. The term "media length" refers to the dimension of the media that is aligned with the media path. "Media process direction" describes the movement of media within the imaging system and is generally meant to be from an upstream location such as an input tray toward a downstream location such as an output of the imaging system. For a duplex path, the media process direction is generally from a position downstream of the print engine to a position upstream of the print engine. Further relative positional terms may be used herein. For example, "superior" means that an element is above another element. Conversely "inferior" means that an element is below or beneath another element.

Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again the axes of rotation of the rolls having a separated nip are parallel but are offset from one another along the media path. Nip gap refers to the space between two rolls. Nip gaps may be positive, where there is an opening between the two rolls, zero where the two rolls are tangentially touching or negative where there is an interference fit between the two rolls.

As used herein, the term "communication link" is used to generally refer to a structure that facilitates electronic communication between multiple components. While several communication links are shown, it is understood that a single communication link may serve the same functions as the multiple communication links that are illustrated. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Devices interconnected by a communication link may use a standard communication protocol, such as for example, universal serial bus (USB), Ethernet or IEEE 802.xx, or other communication protocols.

Referring now to the drawings and particularly to FIG. 1, there is shown a diagrammatic depiction of an imaging system 2. As shown, imaging system 2 may include an imaging apparatus 10, and an optional computer 150 attached to the imaging apparatus 10. Imaging system 2 may be, for example, a customer imaging system, or alternatively, a development tool used in imaging apparatus design. Imaging apparatus 10 is shown as a printer that includes a controller 101, a print engine 110, a user interface 102, and/or one or more option assemblies 130. Imaging apparatus 10 may also be configured to include a scanner system and various finishing options such as a stapler, and hole punch.

Controller 101 includes a processor unit and associated memory 103, and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile RAM (NVRAM). Alternatively, memory 103 may be in the form of a separate electronic memory (e.g., RAM, ROM, and/or NVRAM), a hard drive, a CD or DVD drive, or any memory device convenient for use with controller 101. Memory 103 may contain computer programs and look-up tables 104 to be used in controlling operation of imaging apparatus 10 or one or more of its subsystems.

In FIG. 1, controller 101 is illustrated as being communicatively coupled with computer 150 via communication link 141. Controller 101 is illustrated as being communicatively coupled with print engine 110 and user interface 102 via communication links 142, 143, respectively. Computer 150 includes in its memory 151 a software program including program instructions that function as an imaging driver 152, e.g., printer/scanner driver software, for imaging apparatus 10. Imaging driver 152 is in communication with controller 101 of imaging apparatus 10 via communication link 141. Imaging driver 152 facilitates communication between imaging apparatus 10 and computer 150. One aspect of imaging driver 152 may be, for example, to provide formatted print data to imaging apparatus 10, and more particularly to print engine 110, to print an image. Another aspect of imaging driver 152 may be, for example, to facilitate collection of scanned data from a scanner system.

In some circumstances, it may be desirable to operate imaging apparatus 10 in a standalone mode. In the standalone mode, imaging apparatus 10 is capable of functioning without computer 150. Accordingly, all or a portion of imaging driver 152, or a similar driver, may be located in controller 101 of imaging apparatus 10 so as to accommodate printing and/or scanning functionality when operating in the standalone mode.

Print engine 110 and user interface 102 may include firmware maintained in memory 103 which may be performed by controller 101 or another processing element. Controller 101 may be, for example, a combined printer, scanner and finisher controller. Controller 101 serves to process print data and to operate print engine 110 and its subassemblies such as a laser scan unit (LSU) 111, a toner cartridge 112, an imaging unit 113, a fuser 114, a cleaner unit 115 and a developer unit 116, during printing. Controller 101 may provide to computer 150 and/or to user interface 102 status indications and messages regarding the media supply media transport, imaging apparatus 10 itself or any of its subsystems, consumables status, etc. Computer 150 may provide operating commands to imaging apparatus 10. Computer 150 may be located nearby imaging apparatus 10 or be remotely connected to imaging apparatus 10 via an internal or external computer network. Imaging apparatus 10 may also be communicatively coupled to other imaging devices.

Print engine 110 is illustrated as including LSU 111, toner cartridge 112, imaging unit 113, and fuser 114, all mounted within imaging apparatus 10. Imaging unit 113 may be removably mounted within imaging apparatus 10 and includes developer unit 116 that houses a toner sump and a toner delivery system. The toner delivery system includes a toner adder roll that provides toner from the toner sump to a developer roll. A doctor blade provides a metered uniform layer of toner on the surface of the developer roll. Imaging unit 113 also includes cleaner unit 115 that houses a photoconductive drum and a waste toner removal system. Toner cartridge 112 is also removably mounted in imaging apparatus 10 in a mating relationship with developer unit 116 of imaging unit 113. An exit port on toner cartridge 112 communicates with an entrance port on developer unit 116 allowing toner to be periodically transferred from toner cartridge 112 to resupply the toner sump in developer unit 116. Both imaging unit 113 and toner cartridge 112 may be replaceable items for imaging apparatus 10. Imaging unit 113 and toner cartridge 112 may each have a memory device 117 mounted thereon for providing component authentication and information such as type of unit, capacity, toner type, toner loading, pages printed, etc. Memory device 117 is illustrated as being operatively coupled to controller 101 via communication link 142.

The electrophotographic imaging process is well known in the art and, therefore, will be only briefly described. During an imaging operation, LSU 111 creates a latent image by discharging portions of the charged surface of the photoconductive drum in cleaner unit 115. Toner is transferred from the toner sump in developer unit 116 to the latent image on the photoconductive drum by the developer roll to create a toned image. The toned image is then transferred either directly to a media sheet received in imaging unit 113 from one of media input trays 170a, 170b or to an intermediate transfer member (ITM) and then to a media sheet. Next, the toned image is fused to the media sheet in fuser 114 and then sent to an output location 133 or a duplexer 135. One or more gates 134, illustrated as being in operable communication with controller 101 via communication link 142, are used to direct the media sheet to output location 133 or duplexer 135. Toner remnants are removed from the photoconductive drum by the waste toner removal system housed within cleaner unit 115. As toner is depleted from developer unit 116, toner is transferred from toner cartridge 112 into developer unit 116. Controller 101 provides for the coordination of these activities including media movement occurring during the imaging process.

While an electrophotographic printing apparatus is illustrated in imaging apparatus 10, any of a variety of different types of printing mechanisms including dye-sublimation, dot-matrix, or ink-jet printing apparatuses may be used.

Controller 101 also communicates with a controller 120 in each option assembly 130 provided, via communication link 144. Controller 120 operates various motors housed within option assembly 130 that position media for feeding, feed media from media path branches PB into media path P or media path extensions PX as well as feed media along media path extensions PX. Controllers 101, 120 control the feeding of media along media path P and control the travel of media along media path P and media path extensions PX.

Imaging apparatus 10 and option assembly 130 each also include a media feed system 160 having a removable media input tray 170a, 170b for holding a media stack MST, and a pick mechanism 180 with a drive mechanism 182 positioned adjacent each removable media input tray 170a, 170b. In FIG. 1, removable media input tray 170a is shown integrated into a lower portion of a housing 20 of imaging apparatus 10. Each media tray 170a, 170b also has a media dam assembly 172 and a feed roll assembly 174. In imaging apparatus 10, pick mechanism 180 is mechanically coupled to drive mechanism 182 that is controlled by controller 101 via communication link 144. In option assembly 130, pick mechanism 180 is mechanically coupled to drive mechanism 182 that is controlled by controller 101 via controller 120 and communication link 144. In both imaging apparatus 10 and option assembly 130, pick mechanisms 180 are illustrated in a position to drive a topmost media sheet from the media stack MST into media dam 172 which directs the picked sheet into media path P or extension PX. Bottom fed media trays may also be used. As is known, media dam 172 may or may not contain one or more separator rolls and/or separator strips used to prevent shingled feeding of media from media stack MST. Feed roll assemblies 174, comprised of two opposed rolls, feed media from an inferior unit to a superior unit via a slotted passageway provided therein.

In imaging apparatus 10, media path P (shown in dashed line) is provided from removable media input tray 170a extending through print engine 110 to output area 133 or to duplexer 135. Media path P may also have extensions PX and/or branches PB (shown in dotted line) from or to other removable media input trays as described herein such as that shown in option assembly 130. Imaging apparatus 10 may include a manual input or multipurpose feeder 310 and media path P may have a corresponding auxiliary media path branch APB that extends from multipurpose feeder 310 and merges with the media path P within imaging apparatus 10. Along media path P and its extensions PX are provided media position sensors 204 which are used to detect the position of the media, usually the leading and trailing edges of the media, as it moves along the media path P or path extension PX. Media position sensor 204 is located adjacent to the point at which media is picked from each of media input trays 170a, 170b or multipurpose feeder 310. Media position sensor 204 in imaging apparatus 10 also accommodates media fed along auxiliary media path branch APB from multipurpose feeder 310 and is illustrated at a position downstream of media tray 170a in imaging apparatus 10. Additional media position sensors may be located throughout media path P and their number and positioning is a matter of design choice. Media position sensors 204 may be an optical interrupter or a limit switch or other type of edge detector as is known to a person of skill in the art.

Media type sensors 207 are provided in imaging apparatus 10 and each option assembly 130 to sense the type of media being fed from respective removable media input trays 170a, 170b. Media type sensor 207 may include a light source, such as an LED and two photoreceptors. One photoreceptor is aligned with the angle of reflection of the light rays from the LED, receives specular light reflected from the surface of the sheet of media, and produces an output signal related to an amount of specular light reflected. The other photoreceptor is positioned off of the angle of reflection, receives diffuse light reflected from the surface of the media and produces an output signal related to the amount of diffused light received. Controller 101, by ratioing the output signals of the two photoreceptors at each media type sensor 207, can determine the type of media in the respective media tray 170.

Media size sensors 208 are provided in image forming device 100 and each option assembly 130 to sense the size of media being fed from removable media input trays 170a, 170b. To determine media sizes such as Letter, A4, A6, Legal, etc., media size sensors 208 detect the location of adjustable trailing edge media supports and may in some cases detect one or both adjustable side edge media supports provided within removable media input trays 170a, 170b as is known in the art. Sensors 204, 207 and 208 are shown in communication with controller 101 via communication link 145.

In one example embodiment, imaging apparatus 10 includes a removable media handling module 300 that is slidable into and removable from housing 20 of imaging apparatus 10, as indicated by arrow 32, through an opening 131 thereof. In one example form, media handling module 300 is slidable into imaging apparatus 10 in a direction substantially parallel to a direction of insertion of media input trays 170a, 17b into imaging apparatus 10. In this example, media handling module 300 is installed in imaging apparatus 10 in the same manner as media tray 170a is installed in imaging apparatus 10.

Media handling module 300 generally includes features that provide and/or allow the formation of one or more segments of media path P within imaging apparatus 10 when media handling module 300 is inserted into imaging apparatus 10. For example, the media path assembly shown in FIG. 1 includes multiple media path segments defined by various points P1, P2, P3, P4, and P5 along media path P. The media path segments include a simplex media path portion SP extending between points P1 and P2, a media exit path portion EP extending from point P2 to output area 133, a duplex media path portion DP extending between points P2, P3, and P1, a first feed through path FP1 extending between points P4 and P1, and a second feed through path FP2 extending between points P5 and P4. In the example shown, duplex media path portion DP includes a first duplex path segment DP1 extending between points P2 and P3, and a second duplex path segment DP2 extending between points P3 and P1. Simplex media path portion SP provides a media path through which a media sheet passes to be directed to print engine 110 for printing an image on a first side of the media sheet. Media exit path portion EP receives the printed media sheet from simplex media path portion SP and directs the printed media sheet to output area 133 or to duplex media path portion DP. Duplex media path portion DP provides a media path for returning the printed media sheet received from the media exit path portion EP back into simplex media path portion SP for printing on a second side of the printed media sheet. First and second feed through paths FP1, FP2 are defined by media feed through channels that allow media sheets from media input trays 170a, 170b to be fed into simplex media path portion SP. When media handling module 300 is inserted into imaging apparatus 100, second duplex path segment DP2 of duplex media path portion DP is formed within imaging apparatus 10 communicating with first duplex path segment DP1, and first feed through path FP1 of media handling module 300 is positioned between points P1 and P4 having its opposed ends respectively in communication with simplex media path portion SP and second feed through path FP2. In the example embodiment illustrated, multipurpose feeder 310 is incorporated in the body of removable media handling module 300. Auxiliary media path branch APB of multipurpose feeder 310 has an exit that communicates with simplex media path portion SP at point P1 when media handling module 300 is inserted into imaging apparatus 10 to allow a media sheet disposed on multipurpose feeder 310 to be fed into simplex media path portion SP.

Removable media handling module 300 includes a feed roll assembly 350 including a plurality of feed roll pairs 351, each pair having opposed rolls 351a, 351b forming feed nips N therebetween, spaced along second duplex path segment DP2. The number and placement of feed roll pairs 351a, 315b is not a limitation of the present disclosure. For each feed roll pair 351a, 351b, one of which may be a driven roll and the other an idler roll. In the illustrated embodiment, feed rolls 351a are driven rolls operatively coupled to a drive motor DM via one or more gear mechanisms (not shown in FIG. 1) while corresponding feed rolls 351b are idler rolls. One or more feed roll pairs 251a, 251b may be mounted within imaging apparatus 10 along first duplex path segment DP1, with each feed roll 251a being a driven roll operatively coupled to drive motor DM and corresponding feed roll 251b being an idler roll. Drive motor DM is in operative communication with controller 101 via communication link 144 and is used to drive feed rolls 351a, 251a to advance media sheets along duplex media path portion DP.

Positioned along second duplex path segment DP2 of duplex media path portion DP is a media path sensor 308. In one example form, media path sensor 308 may be integrated into media handling module 300 and may be a flag and photo-interrupter type of sensor. Alternatively, media path sensor 308 may be mounted within imaging apparatus 10. When the leading edge of the media sheet strikes the flag, the flag blocks or unblocks the photo-interrupter and the output signal changes from a first state to a second state and when the trailing edge of the media sheet passes the flag, the flag unblocks or blocks the photo-interrupter with the output signal changing from the second state to the first state. Other designs for media path sensor 308 providing a similar alternating state change in an output signal may be used.

Figure 2A:
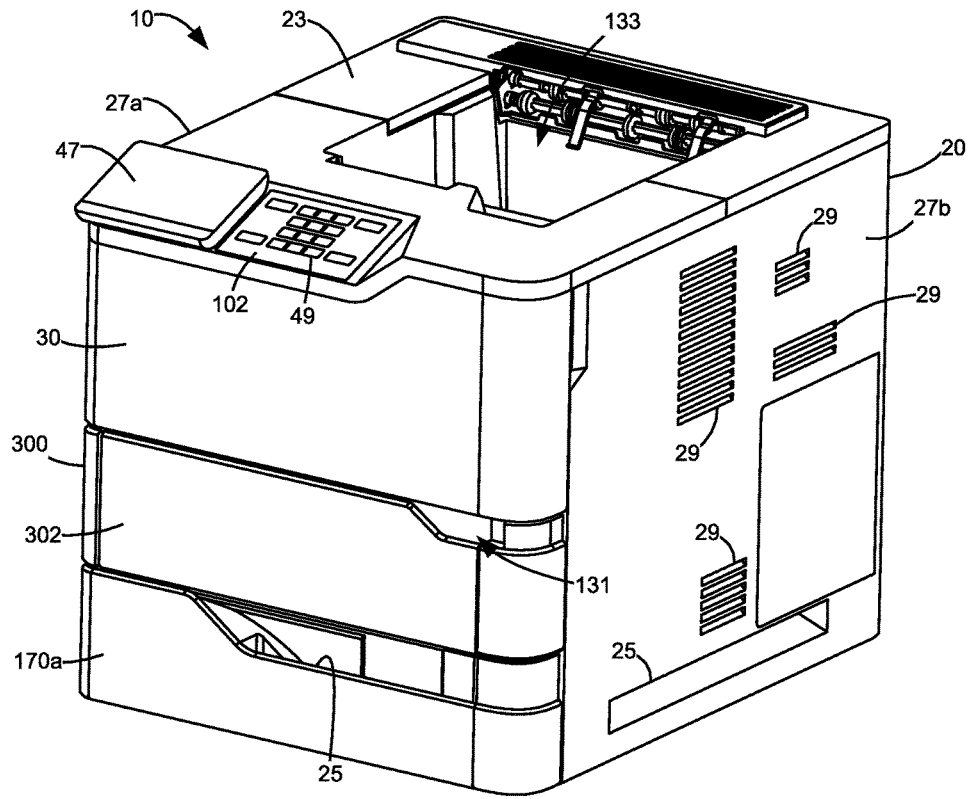
FIG. 2A illustrates an example imaging apparatus of the imaging system in FIG. 1 according to one example embodiment.
Figure 2B:
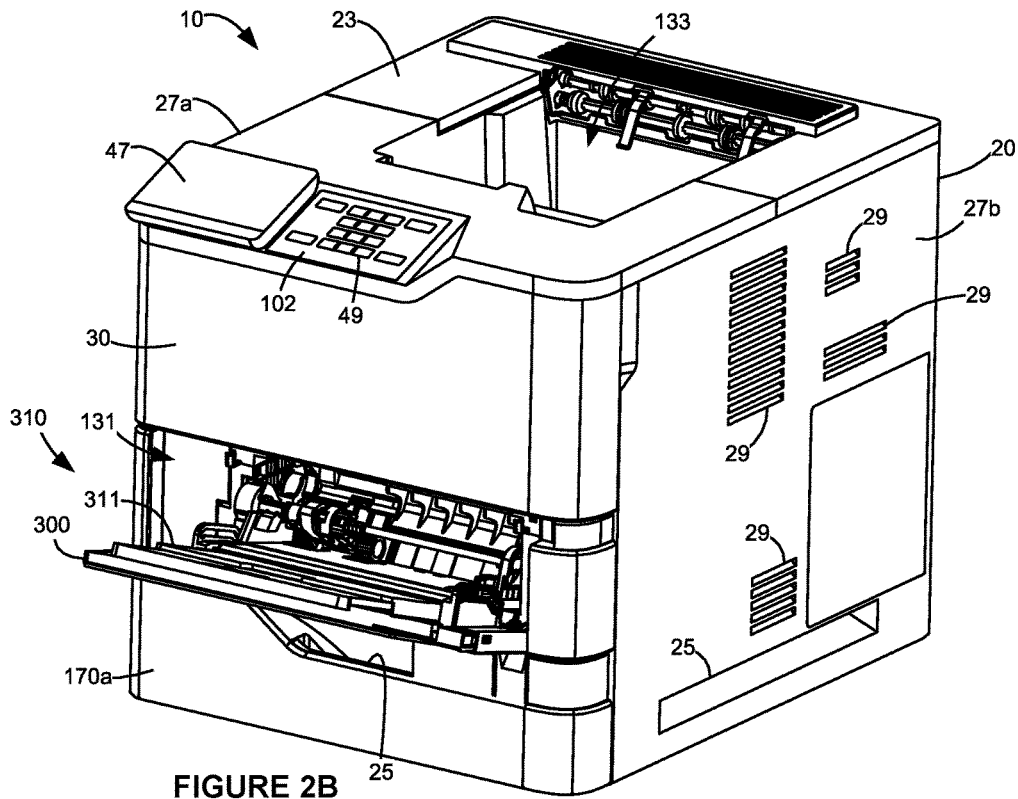
FIG. 2B illustrates an opened multipurpose feeder integrated into a removable media handling module of the imaging apparatus according to one example embodiment.

FIGS. 2A-2D illustrate imaging apparatus 10 including removable media input tray 170a integrated into a lower portion of housing 132 and removable media handling module 300 integrated into a middle portion of housing 20 above media input tray 170a. Print engine 110 and toner cartridge 112 are arranged within an upper portion of housing 20 above media handling module 300 and media output area 133 is provided in a top portion 23 of housing 20. Multipurpose feeder 310 is integrated into media handling module 300 and includes a fold-out tray 311 that is foldable out of a front 302 of media handling module 300, as shown in FIG. 2B, for holding at least one media sheet. Multipurpose feeder 310 may be used for handling envelopes, index cards or other media for which only a small number of media will be printed. Hand grips 25 are provided in several locations of housing 20, such as on sides 27a, 27b, and on the front of media input tray 170a. Also, various ventilation openings, such as vent 29, are provided at locations on sides 27a, 27b of housing 20. User interface 102 is provided in the front top portion of housing 20. User interface 102 may comprise a display 47, such as a touch screen, and a keypad 49. Display 47 and keypad 49 may be used to provide input to controller 101. Display 47 may be used to provide information about the functioning and status of imaging apparatus 10 to a user.

Media handling module 300 is movable between an operational position (FIG. 2A) in which media handling module 300 is inserted into imaging apparatus 10 and an extended position (FIG. 2D) in which media handling module 300 is extended out of opening 131. In the operational position, the media path segments or parts thereof provided by media handling module 300 connect with media path segments provided within imaging apparatus 10 to form media path P. Media handling module 300 includes a lower media guide 370. Lower media guide 370 is positioned parallel to and spaced from a corresponding upper media guide 220 mounted in imaging apparatus 10 when media handling module 300 is inserted into imaging apparatus 10 such that lower media guide 370 and upper media guide 220 forms at least a portion of duplex media path portion DP therebetween, i.e., second duplex path segment DP2, which directs the printed media sheet received from the media exit path portion EP back into the simplex media path portion SP. When media handling module 300 is in the extended position, lower media guide 370 is exposed thereby providing access for clearing media jams therein. Media handling module 300 may be removed or inserted with fold-out tray 311 opened or closed.

Figure 2C:
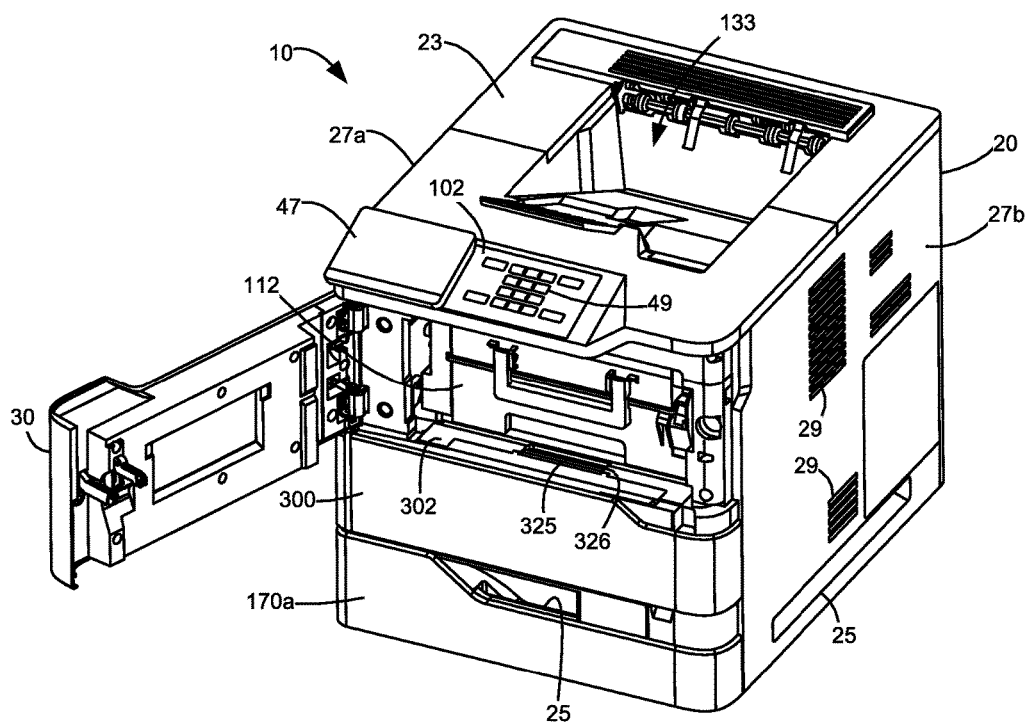
FIG. 2C illustrates the imaging apparatus with an opened front cover to expose a handle for removing the media handling module from the imaging apparatus.
Figure 2D:
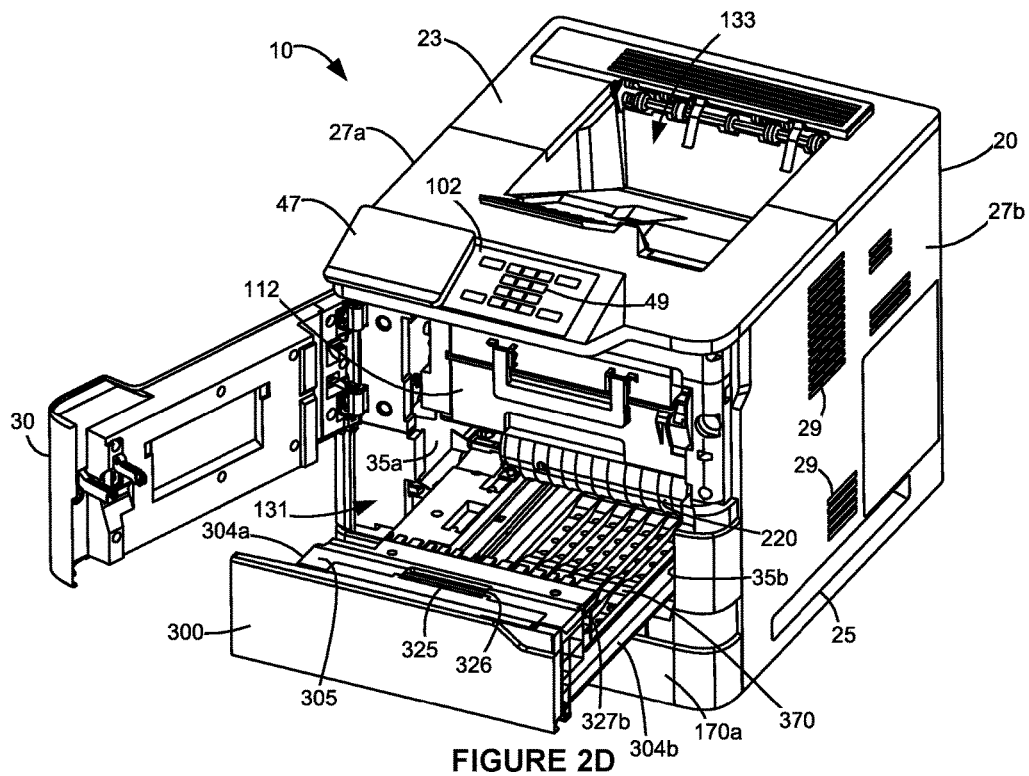
FIG. 2D illustrates the media handling module partially extended out of the imaging apparatus.

Imaging apparatus 10 includes a front cover 30 that is movable between a closed position (FIG. 2A) and an open position (FIG. 2C). In one example embodiment, media handling module 300 may be extended out of opening 131 of housing 20 when front cover 30 is in the open position.

In the example illustrated, opening front cover 30 exposes a handle including a spring biased release actuator 325 provided in a recess 326 on a top portion 305 of media handling module 300. Spring-biased hooks 327 (See also FIGS. 4A and 4B) extend horizontally from sides 304a, 304b of media handling module 300 and serve as latches to secure media handling module 300 to imaging apparatus 10. Spring-biased hooks 327a, 327b are operatively connected to release actuator 325. When media handling module 300 is inserted into imaging apparatus 10, spring-biased hooks 327a, 327b engage with corresponding latch catches or latch holes (not shown) provided in inner side walls 35a, 35b of imaging apparatus 10 locking media handling module 300 in the operational position. To move media handling module 300 in the extended position, a user pulls or slides release actuator 325 against its bias spring toward the front 302 of media handling module 300 which retracts and disengages hooks 327a, 327b from corresponding catches in inner side walls 35a, 35b of imaging apparatus 10, thereby allowing media handling module 300 to be slid out of opening 131. While the above latching mechanism is illustrated, one of skill in the art would recognize that other forms of latch assemblies can be used to the same effect and that the illustrated latching mechanism is not considered to be a limitation of the design. Further, it is contemplated that other means for extending media handling module 300 out of opening 131 without opening front cover 30 may be implemented.

Media handling module 300 may include features that locate it into a predetermined stop position suitable for removing potential media jams, and may further be removed out of opening 131, as shown in FIG. 2E, by pulling media handling module 300 further towards the front until media handling module 300 is removed. In one example, media handling module 300 may include a stop member (not shown) extending from an outer surface thereof, and housing 20 may include an abutment (not shown) provided in an interior surface thereof and disposed in line of engagement with the stop member of media handling module 300. Conversely, the abutment may be provided on the outer surface of media handling module 300 and the stop member may be provided in the interior surface of housing 20. When media handling module 300 is slid out beyond a predetermined point, the stop member contacts the abutment thereby limiting the sliding movement of media handling module 300 at the predetermined stop position. When the stop member is released from engagement with the abutment, such as by applying a force that would overcome the engagement between the stop member and the abutment, media handling module 300 may be slid out of opening 131 and removed from imaging apparatus 10.

Provided in a plate 50 above media input tray 170a (see FIG. 2E) are a pair of parallel slots 51, 52 that extend between inner side walls 35a, 35b. Slots 51, 52 communicate with an entrance of first feed through path FP1 when media handling module 300 is installed in imaging apparatus 10 to allow for the feeding of media from media input tray 170a or from second feed through path FP2, respectively.

Figure 3A:
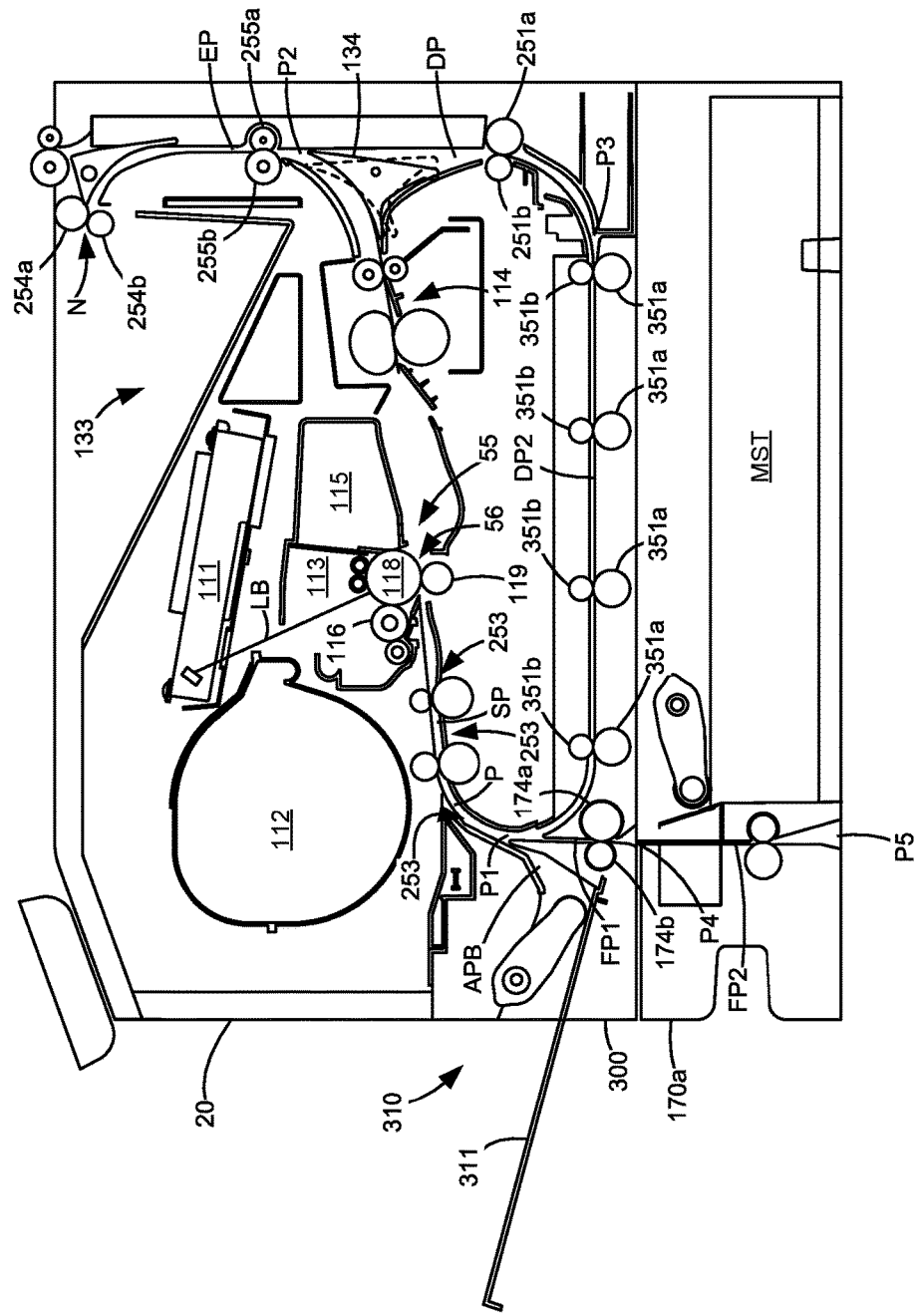
FIGS. 3A-3B illustrate side elevational views of the imaging apparatus when the media handling module is in an operational position and an extended position, respectively.
Figure 3B:
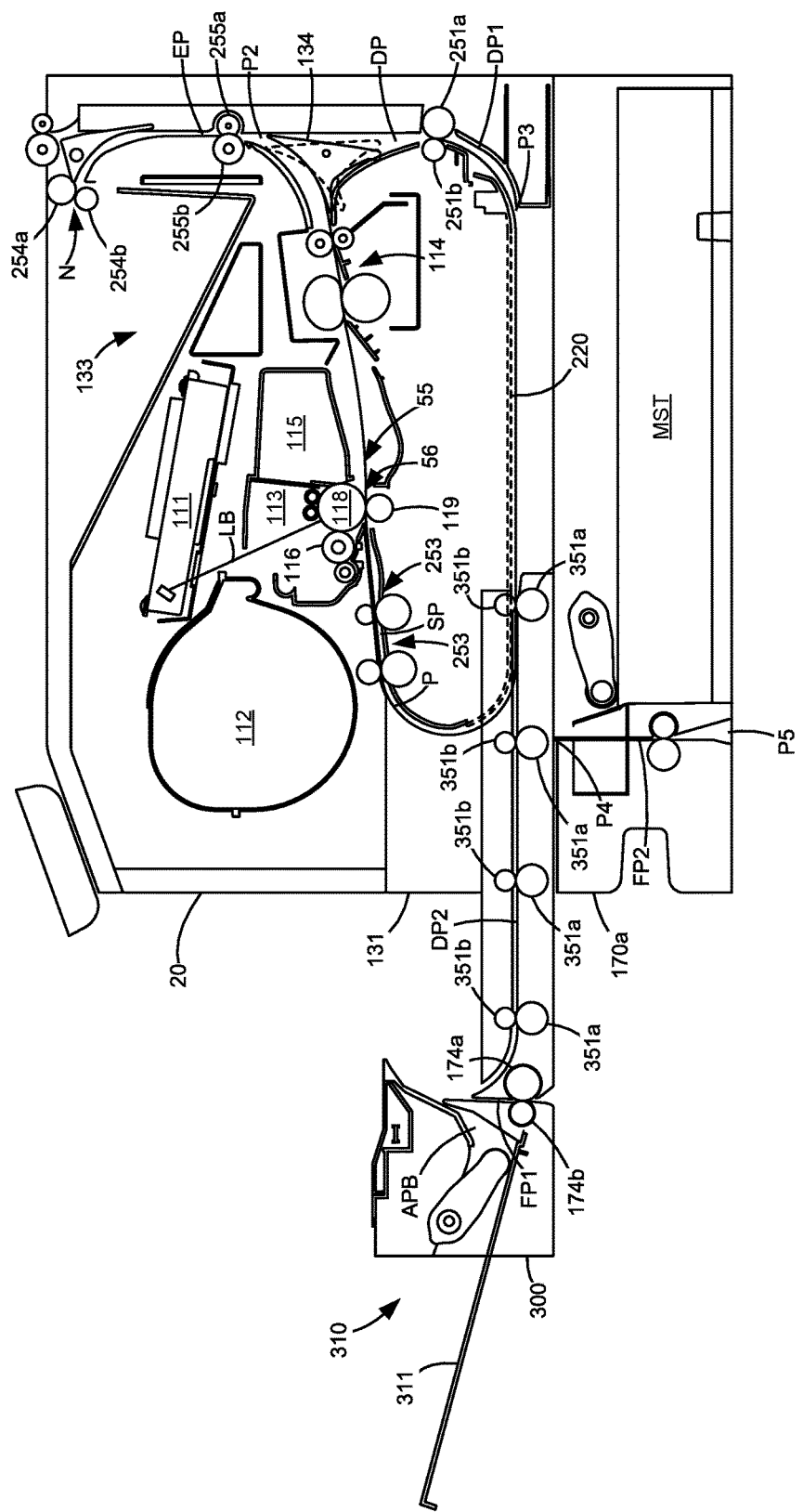

FIGS. 3A-3B illustrate side elevational views of imaging apparatus 10 when media handling module 300 is in the operational position and extended position, respectively, according to one example embodiment. Imaging apparatus 10 includes a toner transfer area 55 having imaging unit 113 that is operably connected to toner cartridge 112 for receiving toner for use in a printing operation. Toner cartridge 112 is controlled to supply toner as needed to developer unit 116. Developer unit 116 is associated with photoconductive drum 118 that receives toner therefrom during toner development to form a toned image on the surface of photoconductive drum 118. Photoconductive drum 118 is paired with a transfer member 119 forming a transfer nip 56 therebetween for use in transferring toner to a sheet of print media that is picked from media input trays 170a, 170b or multipurpose feeder 310 and fed through transfer nip 56 between photoconductive drum 118 and transfer member 119. Fuser 114 is disposed downstream of toner transfer area 55 and receives media sheets with the unfused toner images superposed thereon. In general terms, fuser 114 applies heat and pressure to the media sheets in order to fuse toner thereto. After leaving fuser 114, a media sheet is either deposited into media output area 133 or enters duplex media path portion DP for transport back to toner transfer area 55 for imaging on a second surface of the media sheet.

In the embodiment illustrated, imaging apparatus 10 is depicted as a monochrome laser printer comprising a single toner cartridge 112 and a single imaging unit 113 for forming toner images in a single color. In other alternative embodiments, image forming device 100 may be a color laser printer having four photoconductive members, each corresponding to an associated one of cyan, yellow, magenta, and black image planes, and one or more LSUs for outputting light beams LB toward corresponding photoconductive members to form latent images on each photoconductive member. In the example embodiment illustrated, imaging apparatus 10 is a direct transfer device that transfers toner images from photoconductive drum 118 directly to the media sheet. In another embodiment, imaging apparatus 10 may be a two-step transfer system in which toner is transferred to the media sheet by an intermediate transfer member that receives the toner from the photoconductive drum. As used herein, the term media sheet is meant to encompass not only paper but also labels, envelopes, fabrics, photographic paper or any other desired substrate that can receive a toner image. Further, image forming device 100 may be part of a multifunction product having, among other things, an image scanner for scanning printed sheets.

Media path P extends through imaging apparatus 10 from media input trays 170a, 170b and multipurpose feeder 310 to media output area 133 and is the path along which media sheets travel through imaging apparatus 10. Media path P, as illustrated, includes a serpentine path, a C-path or S-path, comprised of several segments including simplex media path portion SP, media exit path portion EP, duplex media path portion DP, and first and second feed through paths FP1, FP2. The serpentine shape means that the bottom surface of each media sheet that is fed from media trays 170a, 170b will receive the toned image at transfer nip 56. Simplex media path portion SP has an entrance at a point adjacent to where a media sheet exits media handling module 300, such as at point P1, and an exit at a point adjacent to diverter gate 134, such as at point P2. Simplex media path portion SP passes through one or more sets of opposed feed roll pairs 253 and, going in a downstream direction, through toner transfer area 55 and fuser 114. In one example, one or more of feed roll pairs 253 may provide aligner nips for maintaining alignment and orientation of a transported media sheet as it enters toner transfer area 55. The number and placement of opposed feed roll pairs 253 is a matter of design choice. Auxiliary media path branch APB has an entrance in communication with fold-out tray 311 and an exit in communication with the entrance of simplex media path portion SP.

Media exit path portion EP has an entrance adjacent to point P2 and extends to a point where the media sheet exits media path P and enters media output area 133, such as at an exit nip N formed by an exit roll pair 254a, 254b. Additional roll pairs may be disposed along media exit path portion EP, such as a feed roll pair 255a, 255b located adjacent to the entrance of media exit path portion EP. In this example, exit roll pair 254a, 254b and feed roll pair 255a, 255b are reversible and may be driven by a reversible motor (not shown) to move media sheet towards media output area 133, or move the media sheet in a reverse direction into duplex media path portion DP. Diverter gate 134 is positioned adjacent to point P2 and is used to divert a media sheet being retracted by exit roll pair 254a, 254b and/or feed roll pair 255a, 255b into duplex media path portion DP. In one example, diverter gate 134 may be used as a sensor for sensing the leading and trailing edges of the media sheet. Duplex media path portion DP has an entrance that is in communication with the entrance of media exit path portion EP at point P2 and an exit in communication with the entrance of simplex media path portion SP at point P1. Provided the fused media sheet is not undergoing duplex printing, the media sheet would be fed past gate 134 to media output area 133 via feed roll pair 255a, 255b and exit roll pair 254a, 254b. During duplexing, the fused media sheet would be held by exit roll pair 254a, 254b and/or feed roll pair 255a, 255b and gate 134 would be shifted so that the trailing edge of the fused media sheet would enter duplex media path portion DP upon exit roll pair 254a, 254b and/or feed roll pair 255a, 255b being reversed and become the leading edge of the fused media sheet as it is transferred back into simplex media path portion SP. Cleaner unit 115 is positioned downstream of toner transfer area 55 to remove remaining particles of toner from the outer surface of photoconductive drum 118 that has not been transferred onto the media sheet at transfer nip 56.

First feed through path FP1 extends from a point where a media sheet exits media input tray 170a, such as at point P3, and ends at a point where the media sheet enters simplex media path portion SP, such as adjacent point P1. Auxiliary media path branch APB extends from multipurpose feeder 310 and merges into simplex media path portion SP upstream of feed roll pairs 253, such as at point P1, that in turn is upstream of toner transfer area 55. Second feed through path FP2 is illustrated as extending through a front path of media input tray 170a. The downstream end of second feed through path FP2 is illustrated as merging with first feed through path FP1 at point P3 while the upstream end thereof extends through the bottom of media input tray 170a and housing 20. When an option assembly 130 is attached to the bottom of housing 20, a media path extension PX extends through option assembly 130 and media input tray 170b therein with the downstream end thereof being adjacent to the upstream end of second feed through path FP2 and the upstream end thereof extending through the bottom of media input tray 170b and the housing of option assembly 130. Each additional option assembly that is added would have a corresponding media path extension substantially the same as media path extension PX. First and second feed through paths FP1, FP2 and media path extension(s) PX are aligned so that media being transported along them will move in an unobstructed manner into simplex media path portion SP. In each of media input trays 170a, 170b, feed rolls 174 are positioned adjacent to second feed through path FP2 and media path extension PX.

In FIG. 3B, removable media handling module 300 is shown extended out of opening 131 of imaging apparatus 10. When extended, media handling module 300 breaks off the connection of media path segments having junctions at points P1, P2, and P3 such that media from media input trays 170a, 170b and multipurpose feeder 310 will not—be—able to pass through media handling module 300 and be fed into simplex media path portion SP. When media handling module 300 is extended out of opening 131 to an extent that would expose lower media guide 370, a user may remove a jammed media sheet within duplex media path portion DP.

Figure 4A:
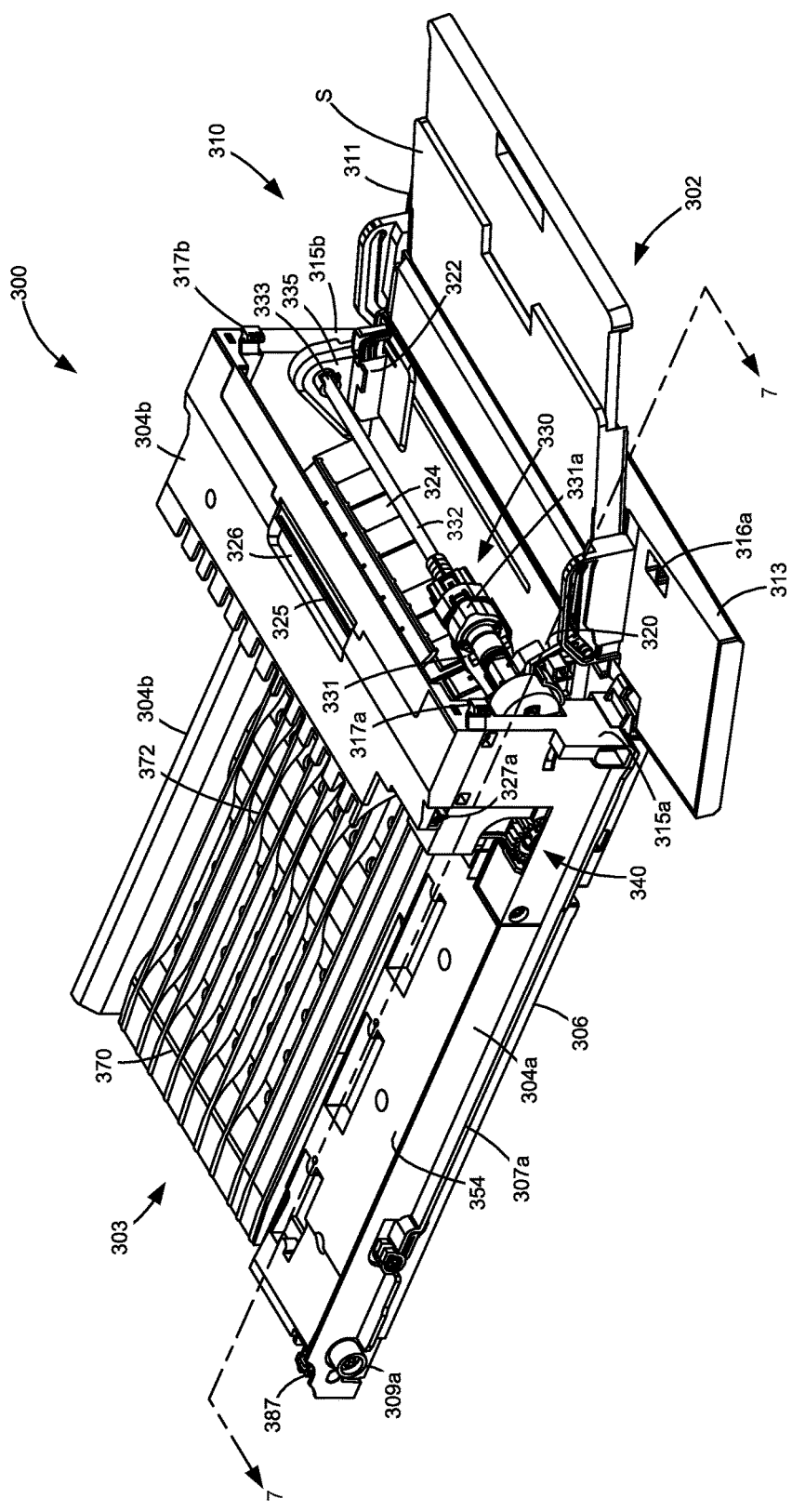
FIGS. 4A-4C illustrate perspective views of the removable media handling module according to one example embodiment.
Figure 4B:
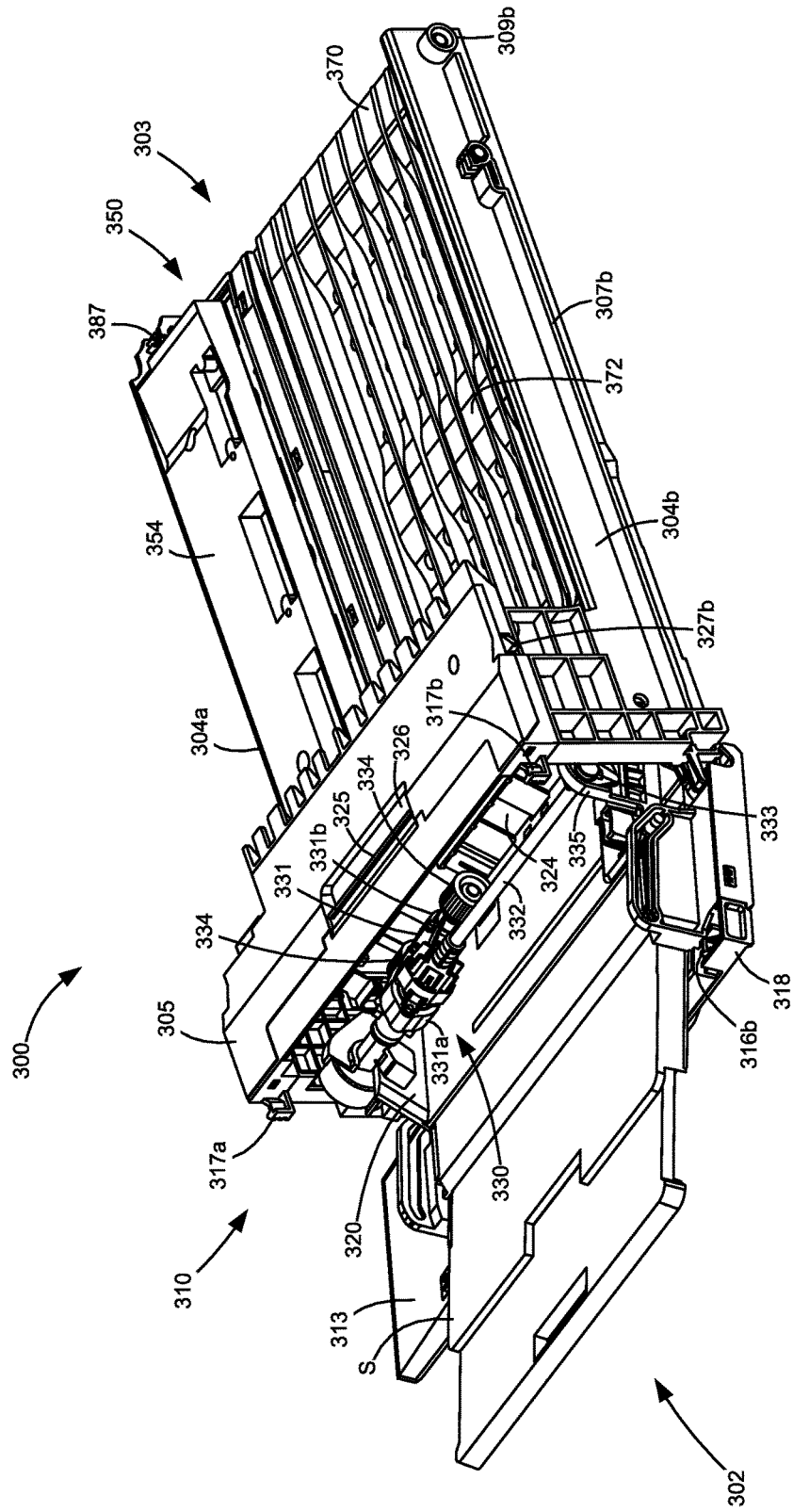
Figure 4C:
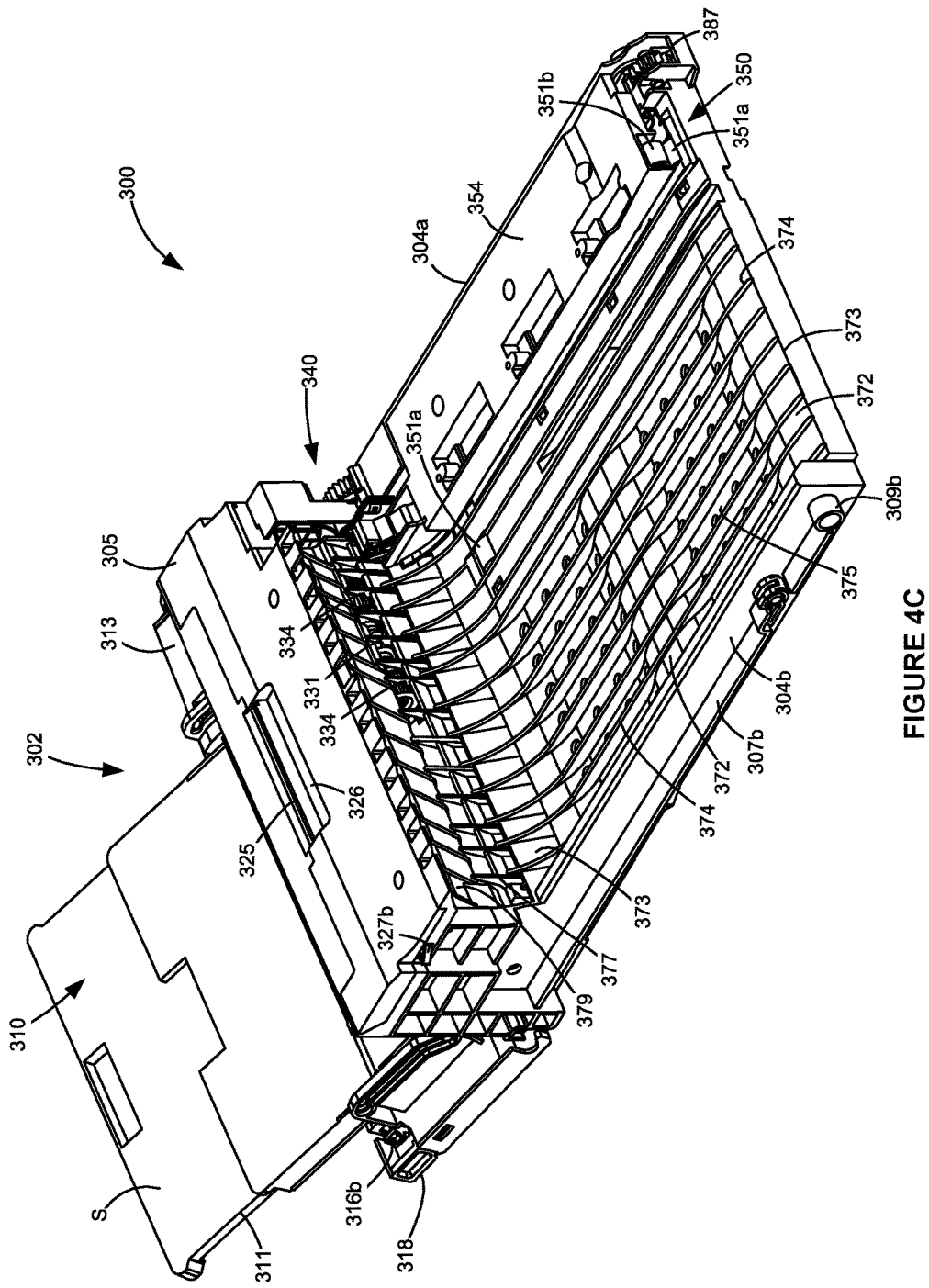

Referring to FIGS. 4A-4C, removable media handling module 300 is shown in further detail according to one example embodiment. As shown, removable media handling module 300 has a front 302, a rear 303, generally parallel sides 304a, 304b, a top 305, and a bottom 306. Front 302 includes multipurpose feeder 310 disposed behind a front panel 313 that is pivotably attached to side wall extensions 315a, 315b and which may be opened to provide access to multipurpose feeder 310. Fold-out tray 311 is provided on the inside of front panel 313 for supporting one or more sheets of media for feeding through multipurpose feeder 310. Fold-out tray 311 may be comprised of two or more overlapping segments that may be extended outwardly to provide a large support surface S for the media sheets. Spring biased latches 316a, 316b are provided on front panel 313 to engage with corresponding hooks 317a, 317b provided in side wall extensions 315a, 315b, respectively, and secure front panel 313 in the closed position. To open front panel 313, a user may move latches 316a, 316b against its biasing force via an actuator 318 which would release latches 316a, 316b from corresponding catches 317a, 317b and allow front panel 313 to be rotated in the open position. A side edge of a media sheet disposed on fold-out tray 311 abuts a reference edge surface 320 and the media sheet is held in place by a transversely slidable edge guide 322 that abuts the opposite side edge of the media sheet. The leading edge of the media sheet abuts a media dam 324 which is at an angle with respect to fold-out tray 311 and directs the leading edge of the media sheet into auxiliary media path branch APB.

Multipurpose feeder 310 includes a pick mechanism 330 having a pick arm 331 mounted on a shaft 332 extending between side wall extensions 315a, 315b. Shaft 332 is rotatably mounted at one end in an opening 333 provided in a mount 335. The other end of shaft 332 extends through an opening in side wall extension 315a and is coupled to a drive mechanism 340. Drive mechanism 340 is positioned to couple with a drive source 37 (see FIG. 2E) in imaging apparatus 10. In the example shown, drive source 37 includes a drive gear 38 protruding from inner side wall 35a and rotatable by a drive motor (not shown) provided within imaging apparatus 10. Pick arm 331 is mounted at a first end 331a thereof to shaft 332 while pick rollers 334 are mounted at a second end 331b of pick arm 331 for contacting a topmost media sheet disposed on fold-out tray 311 and are driven by shaft 332 to pick the topmost media sheet of media sheets disposed on fold-out tray 311. Shaft 332 receives torque from drive mechanism 340 to provide rotational force to pick rollers 334 to drive the topmost media sheet into media dam 324 and into auxiliary media path branch APB. In one example embodiment, pick mechanism 330 may comprise an auto-compensating mechanism drivable by the drive source 37 via drive mechanism 340. Pick rollers 334 rotate in a pick direction when drive source 37 is rotated in a first direction and engages the topmost media sheet for feeding the topmost media sheet into auxiliary media path branch APB.

Figure 5:
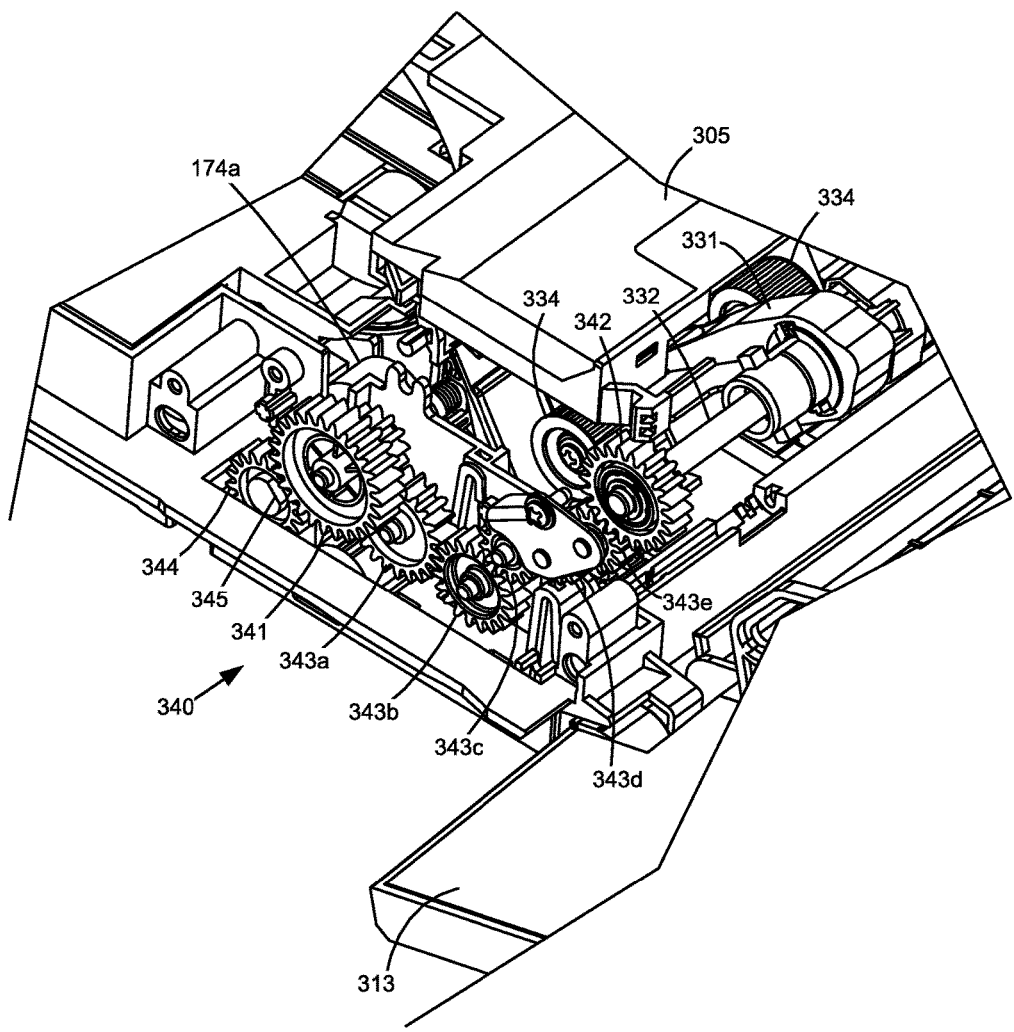
FIG. 5 illustrates a drive mechanism in the removable media handling module for driving a pick mechanism of the multipurpose feeder according to one example embodiment.

Example embodiments include those wherein feed roll assembly 174 and pick mechanism 330 in media handling module 300 are drivable by a common drive source via drive mechanism 340. FIG. 5 illustrates an example embodiment of drive mechanism 340. As shown, drive mechanism 340 includes a transfer gear 341 which is operative to couple with and receive torque from drive gear 38 of drive source 37 when media handling module 300 is installed in imaging apparatus 10. A pick shaft drive gear 342 which drives pick shaft 332 is connected to transfer gear 341 via intermediary gears 343a-343e. A feed roll drive gear 344, which is attached to an end of a shaft 345 on which feed roll 174a is mounted, is connected to transfer gear 341. In operation, when transfer gear 341 is rotated by drive source 37, torque is transferred to pick shaft drive gear 342 and feed roll drive gear 344. In one example embodiment, pick mechanism 330 may be in continuous contact with media disposed on fold-out tray 311 and utilize a clutch to allow pick shaft 332 or pick rollers 334 to freely rotate in one direction. For example, pick shaft drive gear 342 may include a one-way clutch such that pick shaft 332 may be driven, via pick shaft drive gear 342, by a first rotation of the drive source 37 in a feeding direction, while a second or reverse rotation of the drive source 37 may disengage the clutch allowing pick shaft drive gear 342 to freely rotate about shaft 332 so as not to rotate pick rollers 334 and feed media disposed on fold-out tray 311 into simplex media path portion SP as feed roll 174a rotates to feed media along first feed through path FP1 into simplex media path portion SP. In another example embodiment, pick arm 331 and pick rollers 334 may rotate toward or away from the media sheet on fold-out tray 311 depending on the direction of the rotational force applied to shaft 332. For example, when drive source 37 rotates in a first direction, pick arm 331 may pivot towards the media sheet and pick rollers 334 may rotate to pick and feed the media sheet into auxiliary media path branch APB. When drive source 37 rotates in a second or reverse direction, pick arm 331 may be lifted from engagement with the media sheet disposed on fold-out tray 311 and feed roll 174a may rotate to feed media along first feed through path FP1 into simplex media path portion SP.

Referring back to FIGS. 4A-4C, guide rails 307a, 307b are provided on sides 304a, 304b, respectively, in addition to guide rollers 309a, 309b located on the distal ends of sides 304a, 304b to assist with insertion and removal of media handling module 300 into/from imaging apparatus 10. Guide rails 307a, 307b extend along a lengthwise dimension of media handling module 300 corresponding to a direction of insertion thereof into imaging apparatus 10. On inner side walls 35a, 35b of imaging apparatus 10 (see FIG. 2E), guide tracks 39a, 39b, respectively, and guide rollers 40a, 40b, respectively, are provided and cooperatively engage respective guide rails 307a, 307b on media handling module 300 and provide support therefor when it is installed in imaging apparatus 10.

Removable media handling module 300 includes lower media guide 370 extending between front 302 and rear 303 in a direction of insertion of media handling module 300 into imaging apparatus 10. Lower media guide 370 includes a horizontal guide portion 372 and a curved guide portion 373 extending at the back of multipurpose feeder 310 adjacent to an intermediate guide member 377 and an upper guide member 379. Intermediate guide member 377 and upper guide member 379 extend between side wall extensions 315a, 315b and are used to form first feed through path FP1 and auxiliary media path branch APB. Horizontal guide portion 372 and curved guide portion 373 include a plurality of ribs 374 that cooperate with corresponding ribs 224 of upper media guide 220 (See FIG. 6) to reduce surface contact between the media being fed and inner surfaces 225, 375 of upper and lower media guides 220, 370, respectively, during feeding in order to reduce drag and possible media skewing.

Figure 6:
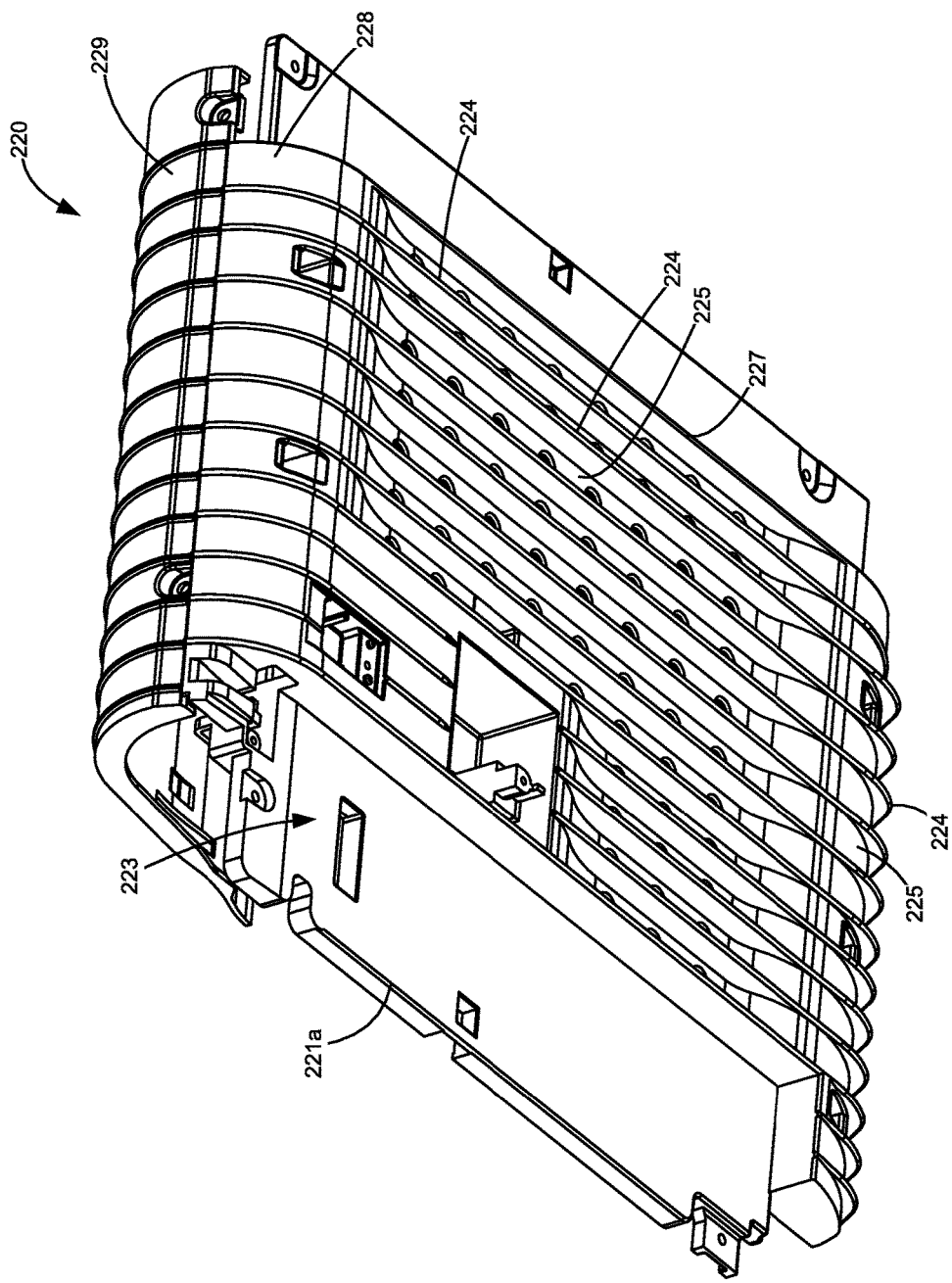
FIG. 6 illustrates an upper media guide mounted in the imaging apparatus.

In the illustrated example embodiment, feed roll assembly 350 is positioned adjacent to side 304a of lower media guide 370. The location of the feed roll assembly 350 adjacent to side 304a may correspond to a reference edge side of media handling module 300. In one example embodiment, driven rolls 351a of feed roll assembly 350 project through corresponding openings 352 in lower media guide 370 while idler rolls 351b are rotatably supported by a frame 354 extending above lower media guide 370. In FIG. 6, upper media guide 220 is shown having a channel 223 on a side portion 221 thereof. Channel 223 is sized to provide a space through which frame 354 of media handling module 300 fits and passes when media handling module 300 is installed in imaging apparatus 10. Upper media guide 220 includes a horizontal guide portion 227 and a curved guide portion 228 that are spaced from horizontal guide portion 372 and curved guide portion 373 of lower media guide 370, respectively, to form second duplex path segment DP2.

Figure 7:
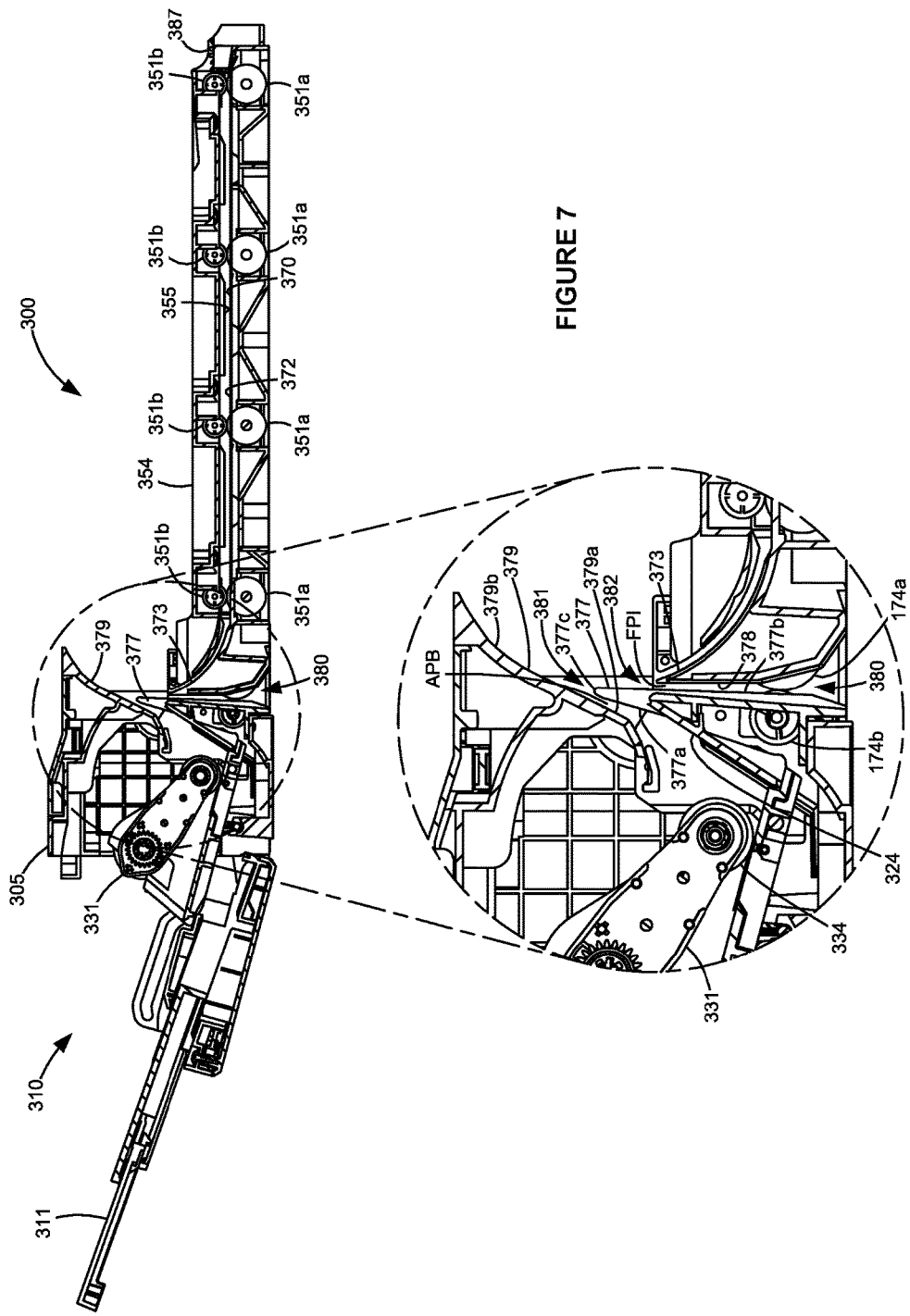
FIG. 7 illustrates a cross-sectional view of the removable media handling module taken along lines 7-7 of FIG. 4A.
Figure 8:
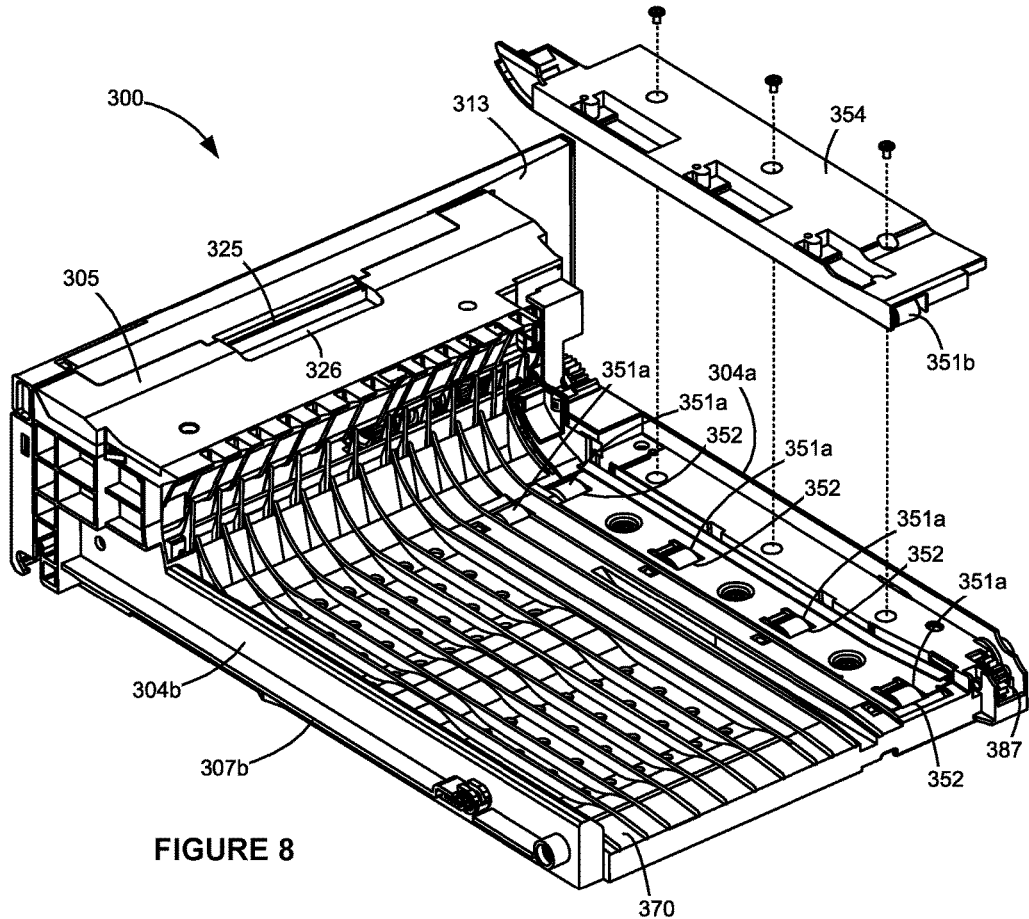
FIG. 8 illustrates a partially exploded view of the removable media handling module.
Figure 9:
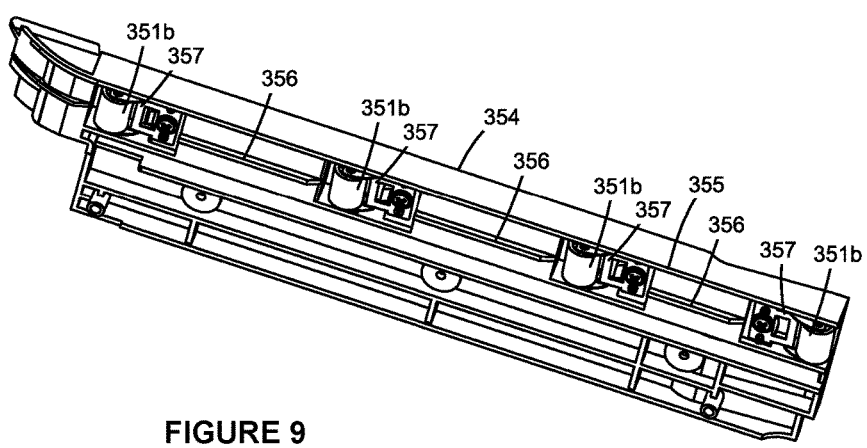
FIG. 9 illustrates a bottom view of a frame supporting idler rolls of a feed roll assembly of the removable media handling module according to one example embodiment.

FIG. 7 illustrates a cross-sectional view of media handling module 300 taken along lines 7-7 of FIG. 4A. In FIG. 8, frame 354 has been detached from media handling module 300 to expose driven rolls 351a projecting through corresponding openings 352. In FIG. 9, a bottom view of frame 354 including idler rolls 351b is shown. Idler rolls 351b are rotatably supported on frame 354 and are spaced laterally along a length thereof. Each idler roll 351b is positioned to contact a respective driven roll 351a. A biasing means, such as a spring 357, may be operatively connected to each idler roll 351b to create a nip force with the respective driven roll 351a. In one example embodiment, the radial size of driven rolls 351a may vary, and in one embodiment, the diameter of the driven rolls 351a may be larger than the diameter of the idler rolls 351b. The bottom of frame 354 defines a bottom guide 355 which may include one or more ribs 356. Bottom guide 355 is spaced from lower media guide 370 to allow an edge portion—of—a media sheet being fed along duplex media path portion DP to pass therethrough. The gap between the bottom guide 355 of frame 354 and lower media guide 370 may be selected to allow passage of different types and thicknesses of media sheets. When media handling module 300 inserted into imaging apparatus 10, bottom guide 355 of frame 354 substantially aligns with horizontal guide portion 227 of upper media guide 220 which, together, form the media guide above lower media guide 370.

Although the above example embodiment show idler rolls 351b being incorporated in removable media handling module 300 and supported by frame 354, it is contemplated that other example embodiments may provide idler rolls within imaging apparatus 10 projecting through corresponding openings in upper media guide 220 and biased toward corresponding feed rolls in lower media guide 370 of media handling module 300.

FIG. 7 further illustrates a close-up view showing intermediate guide member 377 and upper guide member 379 forming first feed through path FP1 and auxiliary media path branch APB. Intermediate guide member 377 provides front and rear media guides 377a, 377b, respectively, that are angled or tapered toward each other at an apex 377c. Front media guide 377a communicates with media dam 324 and is spaced apart from a media guide 379a defined by upper media guide 379 forming auxiliary media path branch APB through which media sheets from multipurpose feeder 310 are fed. Upper media guide 379 extends toward the top 305 to provide a front media guide portion 379b that is spaced from an inner media guide portion 229 of upper media guide 220 (see FIG. 6) to define the entrance of simplex media path portion SP when media handling module 300 is installed in imaging apparatus 10. Rear media guide 377b of intermediate guide member 377 is spaced apart from an inner media guide 378 on a backside of curved guide portion 373 of lower media guide 370 forming first feed through path FP1. Feed roll pair 174a, 174b is positioned at an entrance 380 of first feed through path FP1 to receive media sheets traveling along second feed through path FP2 or media path branch PB in media input tray 170a. The space between media guides 377a, 379a and the space between media guides 377b, 378 adjacent to apex 377c define exits 381, 382, respectively, of auxiliary media path branch APB and first feed through path FP1, respectively, to simplex media path portion SP. In one example embodiment, each media guide 377a, 377b, 378, and 379a includes a plurality of opposed parallel ribs extending parallel to the media feed direction.

Figure 10:
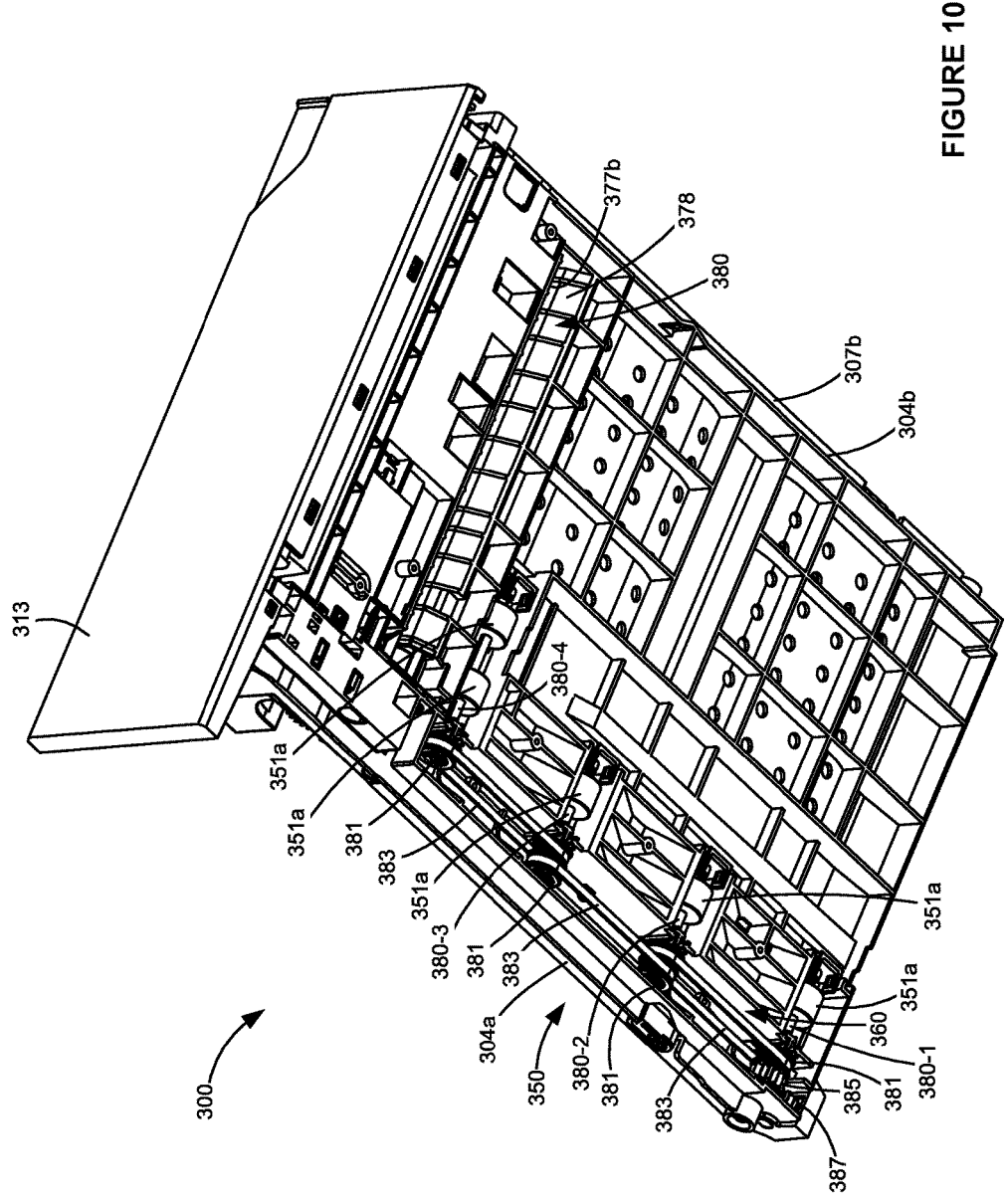
FIG. 10 is a bottom perspective view of the removable media handling module according to one example embodiment.

FIG. 10 is a bottom perspective view of media handling module 300 showing driven rolls 351a of feed roll assembly 350 operatively coupled to each other via a coupling mechanism 360. Each driven roll 351a is mounted to a corresponding shaft 380 with one or more gear wheels 381 disposed and mounted on an end thereof. Each shaft 380 may have one or more driven rolls attached to it. In the example shown, two driven rolls 351a are attached to the most downstream shaft 380-4 while one driven roll 351a is attached to each of the remaining shafts 380-1, 380-2, 380-3. Gear wheels 381 are operatively connected to each other via gear belts 383 such that driven rolls 351a are rotatable together in the same direction and at the same speed. A shaft gear 385 attaches to the shaft 380-1 of the most upstream gear wheel 381 and meshes with a coupler gear 387 rotatably mounted proximate the distal end of lower media guide 370. Coupler gear 387, shown operably connected to each driven roll 351a via shaft gear 385, is positioned to receive rotational force from imaging apparatus 10 for driving each driven roll 351a to rotate so that feed roll pairs 351a, 351b may feed a printed media sheet in duplex media path portion DP into simplex media path portion SP. It will be appreciated that coupling mechanism 360 may be implemented using other suitable coupling schemes such that the driven rolls 351a rotate at the same speed and in the same direction when coupler gear 387 receives rotational force from imaging apparatus 10.

Figure 11:
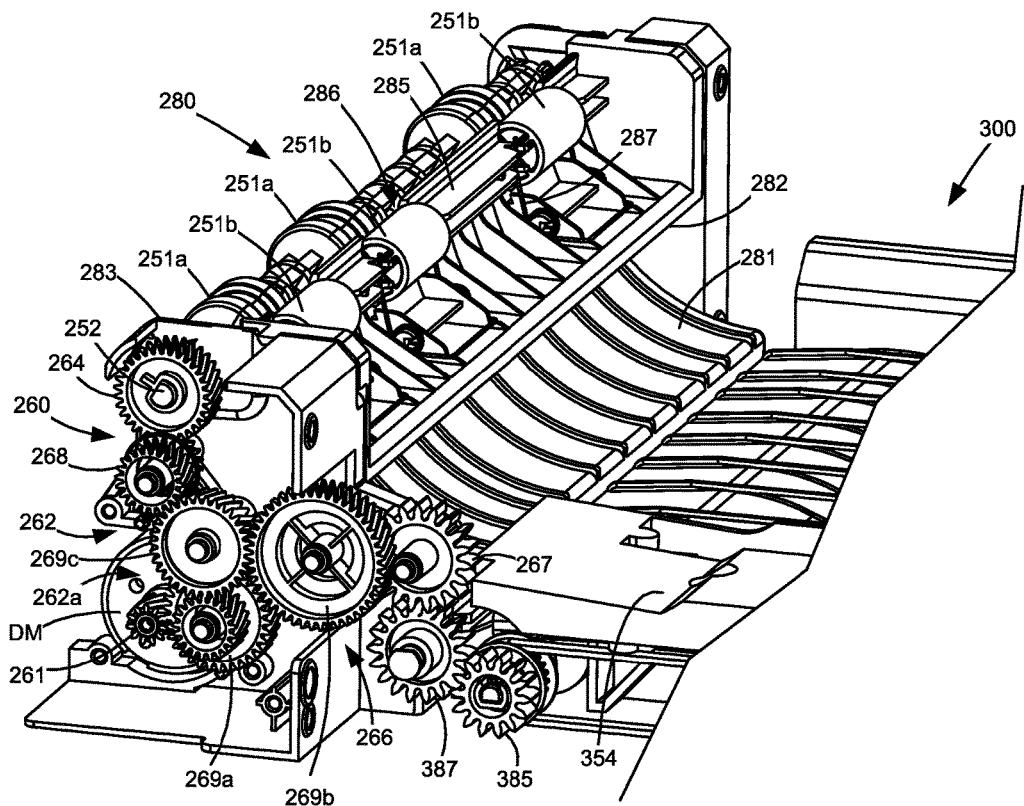
FIG. 11 illustrates a rear guide assembly mounted in the imaging apparatus and in communication with a rear portion of the removable media handling module.

Referring to FIG. 11, coupler gear 387 is shown coupled to a drive mechanism 260 mounted within housing 20 when media handling module 300 is installed in imaging apparatus 10. In the example shown, a rear guide assembly 280 mounted in housing 20 supports drive mechanism 260. During duplex printing, a media sheet fed along duplex media path portion DP is handed off from rear guide assembly 280 to removable media handling module 300. Rear guide assembly 280 defines first duplex path segment DP1 and includes a guide surface 281 that receives the media sheet from media exit path portion EP and directs the media sheet into second duplex path segment DP2. Drive mechanism 260 includes drive motor DM that drives feed roll assembly 350 and feed roll pairs 251a, 251b disposed along first duplex path segment DP1, and a drive transmission 262 having an input 262a connected to motor DM. Feed rollers 251a are mounted on a shaft 252 having a drive gear 264 mounted on an end thereof extending through an opening in a side plate 283. Backup rollers 251b are rotatably mounted in a bracket 285 with each backup roller 251b having a portion of its surface projecting through corresponding opening 286 into the first duplex path segment DP1 of duplex media path portion DP. Backup rollers 251b are biased toward corresponding feed rollers 251a by a biasing means, such as springs 287, to form nips N between feed roll pairs 251a, 251b.

In the example embodiment illustrated, drive transmission 262 includes a gear train 266 having a first output gear 267 that connects to feed roll assembly 350 of removable media handling module 300, and a second output gear 268 connected to feed rollers 251a in rear guide assembly 280. A drive pinion 261 extends from motor DM and connects to drive transmission 262 to transfer rotation force from motor DM to drive transmission 262. First and second output gears 267, 268 are coupled to drive pinion 261 via intermediary gears 269a-269c rotatably mounted within imaging apparatus 10. As shown, first output gear 267 is coupled to drive gear 264 of feed rollers 251a and second output gear 268 is coupled to coupler gear 387 in media handling module 300, which in turn is coupled driven rolls 351a via shaft gear 385. In one example embodiment, the gear ratio from drive pinion 261 to drive gear 264 is substantially the same as the gear ratio from drive pinion 261 to shaft gear 385 such that the same rate of speed and direction is imparted by motor DM to feed rollers 251a in rear guide assembly 280 and driven rolls 351a in media handling module 300.

With the removable duplex module architecture provided for by removable media handling module 300, a handoff of media from rear guide assembly 280 to media handling module 300 occurs when moving media through duplex media path portion DP during duplex printing. If a media jam occurs during this handoff, it can lead to media spanning between rear guide assembly 280 and media handling module 300, with portions of the media sheet being held in nips N of feed roll pairs 251a, 251b in rear assembly 280 and other portions of the media sheet being held in nips N of one or more feed roll pairs 351a, 351b in media handling module 300. Once a user removes media handling module 300, there is a potential for media to remain in imaging apparatus 10 instead of staying in the media handling module 300 because feed roll pairs 251a, 251b in rear guide assembly 280 may have some resistance due to its coupling to drive motor DM. In this case, feed roll pairs 251a, 251b may grab the media and keep it in imaging apparatus 10 when media handling module 300 is removed.

Figure 12:
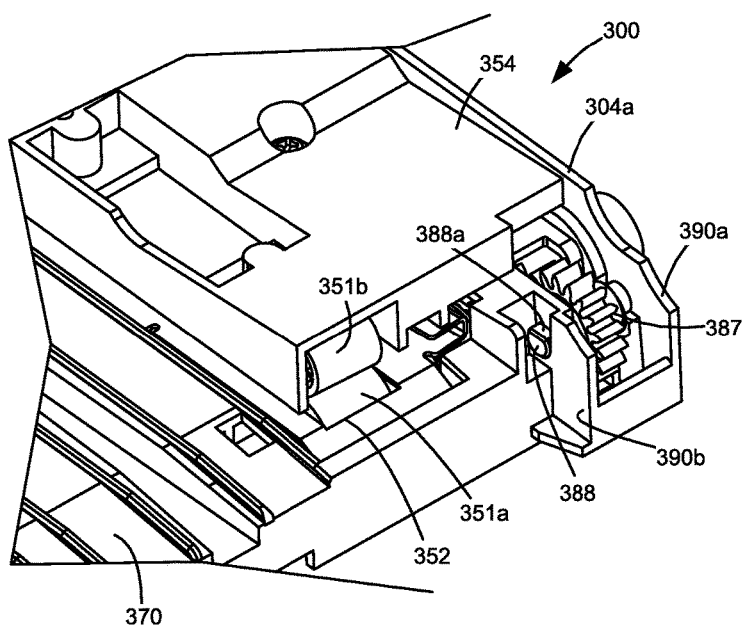
FIG. 12 illustrates a clutched gear mechanism for driving the feed roll assembly of the removable media handling module.

In one example embodiment, media retention in media handling module 300 during removal thereof from housing 20 may be achieved by providing a clutch architecture in the drive mechanism of feed roll assembly 350. In one example, coupler gear 387 may comprise a clutched gear that freely rotates during normal operation of feeding a media sheet along duplex media path portion DP into simplex media path portion SP, but does not rotate in the opposite direction. With reference to FIG. 12, coupler gear 387 may include an embedded clutch riding on a stationary shaft 388 fixedly mounted to opposed walls 390a, 390b at the distal end of media handling module 300, according to one example embodiment. Coupler gear 387 may be referred to as a clutched gear. In the example shown, shaft 388 includes a D-cut portion 388a fitted into a D-cut hole formed in wall 390a such that shaft 388 is constrained from rotating. Coupler gear 387 may include a one-way clutch such that coupler gear 387 is rotatable about shaft 388 in a first direction corresponding to a rotation direction that causes feed roll pairs 351a, 351b to feed media sheets along duplex media path portion DP into simplex media path portion SP, and is restricted from rotating about shaft 388 in a second direction opposite the first direction.

In one example embodiment, coupler gear 387 is configured so that when feed rollers 251a, 251b in rear guide assembly 280 are driven by motor DM to rotate in the media process direction, coupler gear 387 is disengaged from shaft 388 so that it freely rotates in a forward direction (i.e., in a counter clockwise direction in FIG. 11) about shaft 388 and transmits rotational force received from second output gear 268 to shaft gear 385 so as to rotate feed roll pairs 351a, 351b in the media process direction, allowing a media sheet to be fed along duplex media path portion DP from first duplex path segment DP1 into duplex path segment DP2, and into simplex media path portion SP.

When a media sheet M has stopped in a position that spans the length of rear assembly 280 and feed roll assembly 350, such as shown in FIG. 13A, and media handling module 300 is pulled out of opening 131 of housing 20, feed roll pairs 351a, 351b will try to rotate in a reverse media process direction due to the media sheet M being held by feed roll pairs 251a, 251b in rear guide assembly 280. However, with coupler gear 387 being clutched in a reverse direction (i.e., in a clockwise direction in FIG. 11), coupler gear 387 is engaged and locked onto shaft 388 preventing shaft gear 385 and consequently feed roll pairs 351a, 351b from rotating in the reverse media process direction. Accordingly, media sheet M is grabbed by one or more of feed roll pairs 351a, 351b and comes forward with media handling module 300, such as shown in FIG. 13B, and exposed to a user for removal. In one example embodiment, the nip force imparted by feed roll assembly 350 to media sheet M is greater than the resistance imparted to media sheet M by feed roll pairs 251a, 251b in rear guide assembly 280 or any upstream feed roll nips, allowing feed roll assembly 350 to overcome the resistance and retain media sheet M in lower media guide 370 to ensure that media sheet M follows when media handling module 300 is removed. In this way, any jammed media is easily accessible to the user.

Although the above example embodiment show a clutch design using coupler gear 387 to allow for media retention in media handling module 300, it will be appreciated that other methods and techniques to clutch or lock the gears driving feed roll assembly 350 may be implemented. For example, such gears may be locked from turning either direction by a hard locking mechanism actuated by release actuator 325 when media handling module 300 is released from housing 20. In another example, a ratcheting clutch mechanism may be used.

With the above example embodiments, removable media handling module 300 is provided as a duplexer tray module that can be slid in and out of imaging apparatus 10 in the same manner as media input tray 170a in order to provide access to duplex media path portion DP for clearing media jams therein. By extending media handling module 300, jammed media is exposed as upper media guide 220 is integrated into imaging apparatus 10 and left behind once media handling module 300 is accessed. Further, by fully removing media handling module 300, a front portion of simplex media path portion SP is exposed which allows for easier media jam clearance. The above example embodiments also introduce the concept of providing a multipurpose feeder and a duplexer that are integrated or combined into a single removable unit. The modular nature of media handling module 300 further allows for easy replacement.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. A removable media handling module for an imaging apparatus, the imaging apparatus having a simplex media path through which a media sheet passes for printing an image on a first side thereof, a media exit path for receiving a printed media sheet from the simplex media path, the media exit path having an entrance downstream of and in communication with an exit of the simplex media path and an exit in communication with a media output area for receiving the printed media sheet, and a duplex media path having an entrance in communication with the entrance of the media exit path and an exit in communication with an entrance of the simplex media path, the duplex media path providing a media path for returning the printed media sheet for printing on a second side thereof, the removable media handling module comprising:

a body having a front and a rear, the body slidable into and removable from the imaging apparatus;

a lower media guide having a first length extending from the front to the rear in a direction of insertion of the body into the imaging apparatus, and with the media handling module inserted into the imaging apparatus, the lower media guide is positioned parallel to and spaced from a corresponding upper media guide immovably mounted in the imaging apparatus having a second length substantially the same as the first length of the lower media guide, the lower and upper media guides forming at least a portion of the duplex media path therebetween with the exit of the duplex media path being directly connected to the entrance of the simplex media path, the duplex media path directing the printed media sheet received from an intersection of the exit of the simplex media path and the entrance of the media exit path back into the simplex media path for printing a second image on the second side of the printed media sheet; and a manual input feeder having a fold-out tray that is foldable out of the front of the body for holding at least one media sheet, the manual input feeder including a media path branch having an entrance in communication with the fold-out tray and an exit directly connected to the entrance of the simplex media path to allow the at least one media sheet when disposed on the fold-out tray to be fed into the simplex media path when the media handling module is inserted into the imaging apparatus.

2. The removable media handling module of claim 1, further comprising a media feed through channel extending from a bottom of the body to the entrance of the simplex media path, the media feed through channel for allowing a media sheet to be fed from a media input tray of the imaging apparatus positioned below the media handling module and into the simplex media path when the media handling module is inserted into the imaging apparatus.

3. The removable media handling module of claim 1, further comprising a feed roll assembly disposed along the duplex media path for feeding the printed media sheet from an intersection of the exit of the simplex path and the entrance of the media exit path along the duplex media path and into the simplex media path.

4. The removable media handling module of claim 1, further comprising a plurality of driven rolls disposed along the duplex media path and projecting through corresponding openings in the lower media guide, the plurality of driven rolls operative to receive rotational force from the imaging apparatus to drive the printed media sheet along the duplex media path.

5. The removable media handling module of claim 4, further comprising a frame extending above the lower media guide and a plurality of idler rolls rotatably mounted on the frame, each idler roll positioned to contact a respective one of the plurality of driven rolls to form a nip therebetween.

6. The removable media handling module of claim 1, further comprising opposed guide rails provided on opposed sides of the body and extending along a lengthwise dimension of the body corresponding to the direction of insertion thereof into the imaging apparatus.

7. The removable media handling module of claim 1, further comprising a latch mechanism for locking the body to the imaging apparatus, and a spring biased actuator disposed on a top of the body and operatively connected to the latch mechanism for releasing the latch mechanism from locking engagement with the imaging apparatus to release the body therefrom.

8. A removable media handling module for an imaging apparatus, the imaging apparatus having a simplex media path through which a media sheet passes for printing an image on a first side thereof, a media exit path for receiving a printed media sheet from the simplex media path, the media exit path having an entrance downstream of and in communication with an exit of the simplex media path and an exit in communication with a media output area for receiving the printed media sheet, and a duplex media path having an entrance in communication with the entrance of the media exit path and an exit in communication with an entrance of the simplex media path, the duplex media path providing a media path for returning the printed media sheet for printing on a second side thereof, the removable media handling module comprising:
  a body having a front, a rear, and a bottom, the body horizontally slidable into and removable from the imaging apparatus through an opening thereof;
  a first media guide having a first length extending from the front to the rear in a direction of insertion of the body into the imaging apparatus, and with the media handling module inserted into the imaging apparatus, the first media guide is positioned parallel to and spaced from a corresponding second media guide immovably mounted in the imaging apparatus and having a second length substantially the same as the first length of the first media guide, the first and second media guides forming at least a portion of the duplex media path therebetween with the exit of the duplex media path being directly connected to the entrance of the simplex media path, the duplex media path directing the printed media sheet received from an intersection of the exit of the simplex path and the entrance of the media exit path back into the simplex media path for printing a second image on the second side of the printed media sheet;
  a media feed through channel extending from the bottom of the body to the entrance of the simplex media path, the media feed through channel for allowing a media sheet to be fed from a media input tray of the imaging apparatus positioned below the media handling module and into the simplex media path when the media handling module is inserted into the imaging apparatus; and
  a manual input feeder having a fold-out tray that is foldable out of the front of the body for holding at least one media sheet, the manual input feeder including a media path branch having an entrance in communication with the fold-out tray and an exit directly connected to the entrance of the simplex media path to allow the at least one media sheet when disposed on the fold-out tray to be fed into the simplex media path when the media handling module is inserted into the imaging apparatus.

9. The removable media handling module of claim 8, wherein the second media guide is positioned above the first media guide when the removable media handling module is inserted into the imaging apparatus, and wherein the first media guide disengages from the at least the portion of the duplex media path formed with the second media guide when the removable media handling module is removed from the imaging apparatus.

10. The removable media handling module of claim 8, further comprising a feed roll assembly positioned along the duplex media path for feeding the printed media sheet received from an intersection of the exit of the simplex media path and the entrance of the media exit path into the simplex media path.

11. The removable media handling module of claim 10, wherein the feed roll assembly includes a plurality of feed roll pairs positioned along the duplex media path, each feed roll pair including a driven roll and an idler roll forming a nip therebetween.

12. The removable media handling module of claim 11, further comprising a frame extending above the first media guide, wherein one of the driven rolls and the idler rolls project through corresponding openings in the first media guide for forming a nip with the other of the driven rolls and the idler rolls, and wherein the other of the driven rolls and the idler rolls are rotatably mounted on the frame.

13. The removable media handling module of claim 8, further comprising a media path sensor disposed along the duplex media path for sensing a media sheet passing through the duplex media path.

14. The removable media handling module of claim 8, wherein the body is slidable into and removable from a middle portion of the imaging apparatus between a print engine thereof and the media input tray.

15. An imaging apparatus, comprising:
  a housing;
  a removable media input tray integrated into a lower portion of the housing for storing a stack of media sheets;
  a print engine arranged within an upper portion of the housing for printing images onto a media sheet fed from the media input tray;
  a media path assembly including a simplex media path through which a media sheet passes to be directed to the print engine for printing an image on a first side of the media sheet, a media exit path for receiving a printed media sheet from the simplex media path, the media exit path having an entrance downstream of and in communication with an exit of the simplex media path and an exit in communication with a media output area for receiving the printed media sheet, and a duplex media path having an entrance in communication with the entrance of the media exit path and an exit in communication with an entrance of the simplex media path, the duplex media path providing a media path for returning the printed media sheet for printing on a second side thereof;
  a removable media handling module slidable into and removable from a middle portion of the housing between the media input tray and the print engine through an opening of the housing, the media handling module having a lower media guide with a first length extending from a front to a rear of the removable media handling module in a direction of insertion of the media handling module into the imaging apparatus, and with the media handling module inserted into the imaging apparatus, the lower media guide is positioned parallel to and spaced from a corresponding upper media guide immovably mounted in the imaging apparatus and having a second length substantially the same as the first length of the lower media guide, the lower and upper media guides forming at least a portion of the duplex media path therebetween with the exit of the duplex media path being directly connected to the entrance of the simplex media path, the duplex media path directing the printed media sheet received from an intersection of the exit of the simplex media path and the entrance of the media exit path back into the simplex media path for printing a second image on the second side of the printed media sheet; and the removable media handling module including a manual input feeder having a fold-out tray that is foldable out of a front of the media handling module for holding at least one media sheet, the manual input feeder including a media path branch having an entrance in communication with the fold-out tray and an exit directly connected to the entrance of the simplex media path to allow the at least one media sheet when disposed on the fold-out tray to be fed into the simplex media path when the media handling module is inserted into the imaging apparatus.

16. The imaging apparatus of claim 15, wherein the removable media handling module includes a media feed through channel extending from a bottom thereof to the entrance of the simplex media path, the media feed through channel for allowing a media sheet to be fed from the media input tray positioned below the media handling module and into the simplex media path when the media handling module is inserted into the imaging apparatus.

17. The imaging apparatus of claim 15, wherein the direction of insertion of the media handling module into the housing corresponds to a direction of insertion of the media input tray into the housing.

18. The imaging apparatus of claim 15, wherein the media handling module includes a plurality of feed roll pairs positioned along the duplex media path for feeding the printed media sheet therealong, each feed roll pair including a driven roll and an idler roll forming a nip therebetween.

* * * * *